(12) United States Patent
Silva et al.

(10) Patent No.: US 6,934,555 B2
(45) Date of Patent: Aug. 23, 2005

(54) SOFTWARE ANALYSIS TOOL FOR CDMA SYSTEM

(75) Inventors: Juan J. Silva, San Diego, CA (US); Mauricio Guerra, San Diego, CA (US); Reza Shahidi, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 728 days.

(21) Appl. No.: 09/896,369

(22) Filed: Jun. 29, 2001

(65) Prior Publication Data

US 2003/0064741 A1 Apr. 3, 2003

(51) Int. Cl.[7] .............................................. H04B 7/00
(52) U.S. Cl. ...................... 455/522; 455/69; 455/450; 455/452.2
(58) Field of Search .................. 455/522, 69, 450, 455/452.2, 115, 33.1, 67.3, 63, 453, 405, 67.1, 67.6

(56) References Cited

U.S. PATENT DOCUMENTS

| | | | |
|---|---|---|---|
| 5,710,758 A | | 1/1998 | Soliman et al. |
| 5,838,671 A | * | 11/1998 | Ishikawa et al. ............ 370/335 |
| 5,963,867 A | | 10/1999 | Reynolds et al. |
| 6,125,105 A | * | 9/2000 | Edwards et al. ............ 370/230 |
| 6,385,462 B1 | * | 5/2002 | Baum et al. ................. 455/522 |
| 6,643,521 B1 | * | 11/2003 | Bourgoin et al. ........... 455/522 |
| 6,721,568 B1 | * | 4/2004 | Gustavsson et al. ........ 455/450 |
| 2001/0017882 A1 | * | 8/2001 | Umeda et al. ............... 375/130 |
| 2001/0053695 A1 | * | 12/2001 | Wallentin .................... 455/436 |
| 2002/0173315 A1 | * | 11/2002 | Chmaytelli et al. ......... 455/453 |
| 2002/0183064 A1 | * | 12/2002 | Gopalakrishnan et al. .. 455/452 |
| 2003/0054773 A1 | * | 3/2003 | Vanghi ......................... 455/70 |

FOREIGN PATENT DOCUMENTS

| | | |
|---|---|---|
| EP | 0939566 | 1/1999 |
| WO | WO 0038351 | 1/2000 |

OTHER PUBLICATIONS

Kim K et al: "A Call Admission Algorithm With Optimal Power Allocation for Multiple Class Traffic in CDMA Systems" VTC 2000–Fall. IEEE VTS 52nd. Vehicular Technology Conference. Boston, MA, Sep. 24–28, 2000, IEEE Vehicular Technology Conference, New York, NY: IEEE, US, vol. 6 of 6. Conf. 52, Sep. 24, 2000, pp. 2666–2671, XP001033023 ISBN:0–7803–6508–9.

Kazmi M et al: "Admission control Strategy and Scheduling Algorithms for Downlink Packet Transmission in WCDMA" VTC 2000–Fall. IEEE VTS 52nd. Vehicular Technology Conference. Boston, MA, Sep. 24–28, 2000, IEEE Vehicular Technology Conference, New York, NY: IEEE, US, vol. 2 of 6. Conf. 52, Sep. 24, 2000, pp. 674–680, XP001017328 ISBN: 0–7803–6508–9.

* cited by examiner

*Primary Examiner*—Nick Corsaro
*Assistant Examiner*—Tan Trinh
(74) *Attorney, Agent, or Firm*—Coats & Bennett, P.L.L.C.

(57) ABSTRACT

A wireless network planning tool simulates wireless network operation, including subscriber admission processing based resource reservation procedures. Simulated subscribers are associated with an application type. Application types are broadly categorized as either voice type or data type applications. Subscribers of both types are simultaneously simulated. During subscriber admission processing, the CDMA planner attempts to admit simulated subscribers to individual sectors or base stations. At each sector, a percentage of the total forward power capacity is reserved for voice users, and a second or remaining percentage may be reserved for data users. When admitting a voice user to a sector with insufficient remaining power in its voice bucket, the CDMA planner may borrow from the power bucket reserved for data users. Setting aside a power bucket for voice users at each sector insures that one or a few high data rate users do not consume all available resources in a sector.

35 Claims, 25 Drawing Sheets

FALLBACK PROCEDURE

FORWARD LINK ANALYSIS OVERVIEW

FULL RATE FORWARD
TRAFFIC CHANNEL
CALCULATIONS

UPPER/LOWER POWER BOUNDER PER TRAFFIC CHANNEL

DETERMINE AVERAGE
POWER PER FORWARD
CHANNEL TYPE

DETERMINE TOTAL
AVERAGE POWER PER
SUBSCRIBER

IDENTIFY SERVING SECTOR FOR TWO-WAY COMMUNICATIONS PER SUBSCRIBER

FORWARD CALL ADMISSIONS/BLOCKING OVERVIEW

CALL BLOCKING
WITH HAND-OFF

CALL BLOCKING, NO
HAND-OFF

TOTAL VOICE AND
DATA PWR PER
SECTOR

FORWARD BLOCKING
DETAILS (WITH
HAND-OFF)

FORWARD BLOCKING WITH HAND-OFF (CONTINUED)

VOICE SUBSRIBER
CALL ADMISSION VOICE
BUCKET CHECK

REMOVE POWR LIMITED SECTOR

CHECK VOICE BUCKET
(BLOCKING WITH NO
HAND-OFF CONTINUED)

SOFTWARE ANALYSIS TOOL FOR CDMA SYSTEM

BACKGROUND OF THE INVENTION

Network planning requires the system's engineer to predict network performance based upon geographic data, network configuration, and expected demands. Network planning tools that simulate operation of a network provide a convenient method of network planning. Network planning tools allow the system designer to simulate the operation of various network configurations and make changes to the network based on statistical data output by the simulation. The ability to simulate network operations allows system designers to more rapidly design and implement mobile communication networks.

One example of a network planning tool is described in U.S. Pat. No. 5,710,758 to Solomon et al. This patent describes a network planning tool for designing a communication network based on Code Division Multiple Access (CDMA). Another network planning tool is described in U.S. patent application Ser. No. 09/825,133, filed on Apr. 2, 2001, entitled "SYSTEM AND METHOD FOR RADIO NETWORK DIMENSIONING." This application describes how call models can be used in a network planning tool. This application is also incorporated herein by reference.

Recently, system operators have begun to plan and implement communication networks that support high data rate applications. These new communication networks allow a complex mix of subscriber applications, such as web access, email, and multi-media applications, as well as voice. The standards being implemented to support high data rate applications, such as the CDMA2000 standard, greatly increase the number of variables that affect network capacity. Currently, there is not a network planning tool for simulating communication networks that implement the CDMA2000 standard.

BRIEF SUMMARY OF THE INVENTION

The present invention provides a network planning tool for communication networks that support a complex mix of voice and data users. In one aspect of the invention, a plurality of subscriber units are defined based upon demand maps input by the user. Each subscriber unit is assigned a subscriber type that is associated with a particular application. For each application, a desired peak data rate, a minimum data rate, and, possibly, one or more fallback data rates are defined. The network planning tool uses the defined data rates in a call admission procedure to determine whether a subscriber unit can establish a communication link. A separate call admission procedure is performed for both the reverse link and forward link channels.

In the call admission procedure for the reverse link channels, the network planning tool determines, for each subscriber unit, whether the subscriber unit assigned to a particular subscriber type running a particular application can establish a communication link at the desired data rate with at least one base station in the communication network being simulated. If the subscriber unit cannot establish a communication link with at least one base station at the desired peak data rate, the network planning tool determines whether the subscriber unit can establish a communication link with at least one base station at one of the fallback data rates associated with the application for the corresponding subscriber type.

In the forward link analysis, the call admission procedure determines whether a selected base station has sufficient transmit power available for establishing a forward link communication channel with the subscriber units. The forward link analysis is performed successively for each one of the subscriber units. During the call admission procedure, the planning tool determines the available transmit power for the selected base station and the forward link transmit power required to establish the forward link channel between the subscriber unit and the selected base station at the desired peak data rate. The planning tool then compares the forward link transmit power with the available forward link transmit power. If the required forward link transmit power is lower than the available forward link power, the subscriber unit is admitted. Call admission criteria may consider other limiting factors, such as Walsh Code availability.

In another aspect of the invention, the network planning tool supports multiple radio configurations. Different multiple radio configurations can be supported by a subscriber unit and also by each radio base station. The planning tool then assigns a supported radio configuration to each individual subscriber. The radio configuration is assigned to each subscriber type by choosing the radio configuration that minimizes an energy requirement. In a preferred embodiment, the radio configuration is selected independently for forward link communications and reverse link communications.

In another aspect of the invention, the network planning tool simulates a power reserve for two or more categories of subscribers. The distribution of subscriber units is defined based on a demand map input by the user. Each subscriber unit is associated with a subscriber category. During a forward link analysis, admission of a subscriber unit is dependent upon the available power for a corresponding category of subscribers and the unallocated forward link power. Before beginning the call admission procedure, the total forward link power available to a selected base station for serving a plurality of candidate subscriber units is determined.

During the call admission procedure, the candidate subscriber units are successively admitted or refused service in a determined order. The CDMA planner may determine order based on a variety of techniques. For example, this order may be based on ranking subscribers from a predefined subscriber subset by power consumption, or may represent determining a random order for subscribers for call admission. For each candidate subscriber unit, the planning tool determines the unallocated total forward link power and the available power for a corresponding subscriber category. The candidate subscriber is admitted if the additional power requested by the candidate subscriber is within the limits of the unallocated total forward link power and the available power for the corresponding subscriber category. Otherwise, the candidate subscriber is refused admission.

In another aspect of the invention, during admission, the additional power requested by the candidate subscriber unit is determined based on a desired peak data rate. If the additional power requested by the candidate subscriber unit exceeds the unallocated total power or the available power for the corresponding subscriber category, the additional power requested by the candidate subscriber may be recomputed based on one or more fallback data rates. After recomputing the additional power requested by the candidate subscriber unit, the admissions procedure is re-executed until either the subscriber unit is admitted or until the minimum data rate is reached.

DETAILED DESCRIPTION OF THE INVENTION

The present invention relates to a software planning tool to predict the performance of a code division multiple access (CDMA) communication network. Preferably, the tool supports multiple generations of CDMA technology. For convenience, the software planning tool is referred to herein as the CDMA planner, or simply as the "planner." The CDMA planner predicts CDMA network performance based upon geographic data, demand data, and network configuration data entered by a user. The CDMA planner simulates the operation of a CDMA network compatible with the main enhancements proposed by the TIA/EIA IS-2000A standard, predicts coverage areas served by the network, and outputs performance data useful to network planners to evaluate performance of a particular network configuration supporting voice and data applications. With its support of the TIA/EIA IS-2000A standard, the planner supports and is compatible with prior generations of CDMA technology.

Figure 1:
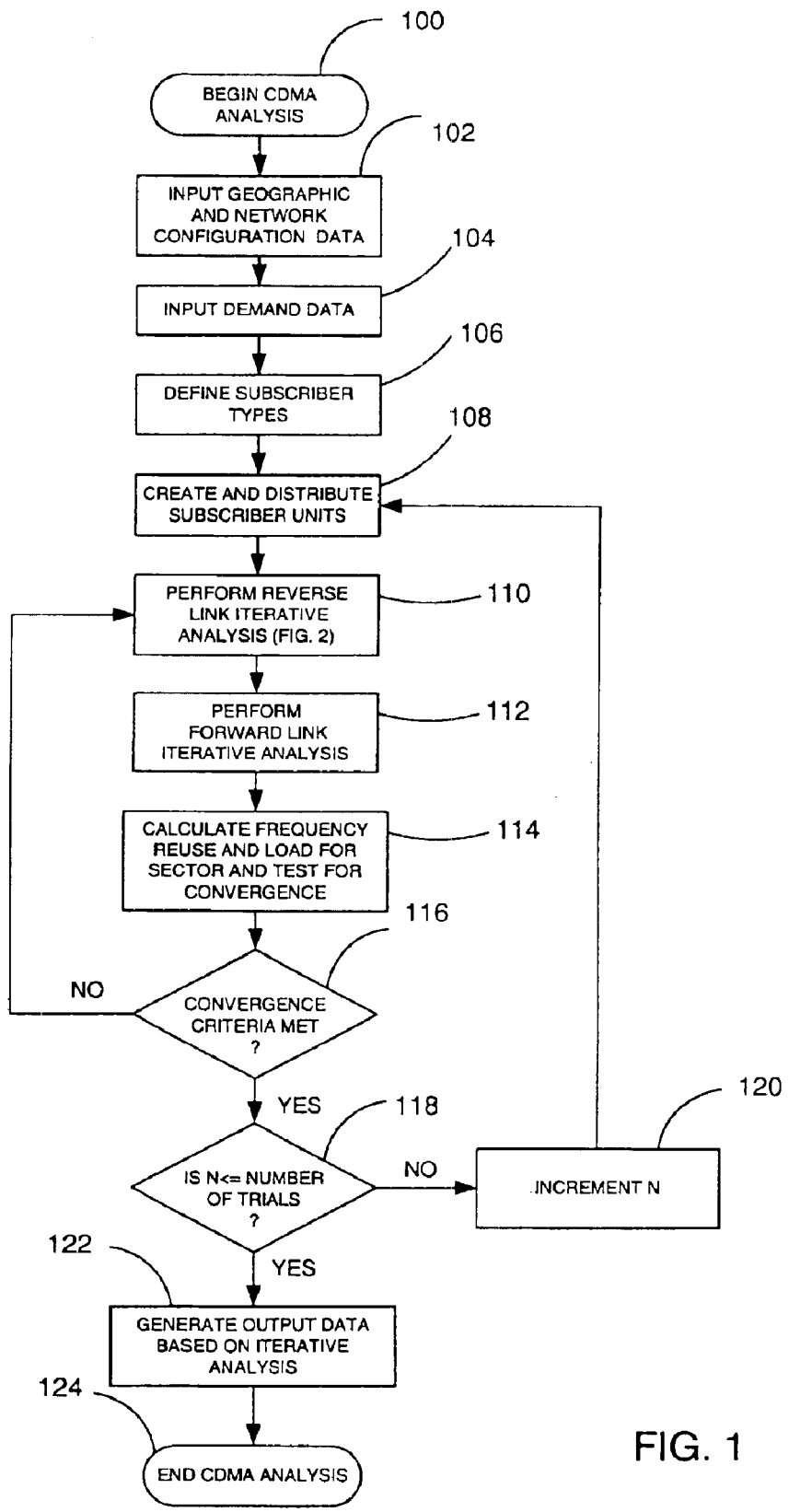
FIG. 1 is a flow diagram overview of the CDMA planner operation.

FIG. 1 is a flow diagram illustrating how simulation of a CDMA network is performed. The CDMA analysis begins at step 100 and at step 102 the user inputs geographic data and network configuration data into a general purpose programmable computer used to perform the simulation. The input data may be stored in a permanent memory device. The geographic data contains a description of the market area served by the network and neighboring region. The market area is divided into bins, which comprise small portions of the market area served by the network. Each bin has an associated XY coordinate that is used to compute the distance of that bin from various radio base stations within the network, and an associated vertical height H relative to some reference height. The geographic data is needed for path loss calculations, as will be hereinafter described.

The network configuration data comprises the location of the base stations within the network, the type of equipment used by the base stations, the frequencies assigned to the base stations, and numerous operating parameters pertaining to the operation of the base stations. Each base station serves a cell or sector k within the network. Network configuration information may also include subscriber unit parameter settings, call model definitions or specifications, and general CDMA technology parameter specification.

At step 104, the user inputs demand data. The demand data may, for example, comprise a data set that contains demand in simultaneous users per square kilometer for every bin in the market area. In instances where land use data is available for the coverage area of the network, demand can also be computed from a land use map table containing demand density information for each land use category. Uniform demand specified on a system-wide basis, or per selected regions, is also an option.

At step 106, the user creates a set of subscriber types that is used in calculations performed by the CDMA planner. The subscriber type definitions include, for example, the minimum and maximum transmit power of the subscriber unit, the number of demodulator units, cable losses and body losses caused by shielding. Each subscriber type definition is associated with a call model and with a particular application.

In the following discussion the notation im(ibin,f$_i$) represents a mapping from bin and frequency assignment space to a subscriber type, where ibin represents a particular subscriber unit located in bin number "ibin," and f$_i$ represents a frequency assignment.

At step 106, the CDMA planner generates a set of subscribers used in the simulation, each denoted by a unique ibin. The subscriber units are placed in randomly selected bins in the coverage area and may be distributed in accordance with the subscriber distribution information provided by the user of the CDMA planner (e.g., uniform or non-uniform distribution). The subscriber type for each subscriber unit is distributed according to the demand map specified by the user.

The CDMA planner analyzes the performance of the CDMA network given this distribution of subscriber units within the network, with the analysis being complete after the CDMA planner converges in all of the trials specified by the CDMA planner user. The analysis can be performed numerous times with different sets of users each time, with each run corresponding to a trial, and where each trial comprises a set of analysis iterations. Alternatively, the CDMA analysis can be performed based on a fixed set of subscriber units input or determined by the user, which approach uses uniform demand. This latter approach may use a defined demand factor (weighting function).

At step 110, a reverse link analysis is performed. The reverse link is the communication link used by a subscriber unit to transmit information (voice and/or data) to a base station. The reverse link analysis determines which locations within the coverage area will be able to establish a reverse link connection with at least one base station and, therefore, be able to receive service, given the total expected demand and the network configuration.

At step 112, the CDMA planner performs a forward link analysis. The forward link is the communication link used by the base station to transmit information (voice and/or data) to one or more subscriber units. The forward link analysis determines the set of locations within the coverage area where some defined subscriber type is able to establish forward link connections with at least one base station. In both the reverse link and forward link analysis, the CDMA planner determines which base stations are able to serve each subscriber unit.

At step 114 the CDMA planner computes the frequency re-use and load for each sector. The frequency reuse and load computed in step 114 is then used by the CDMA planner in step 116 to test for convergence. If the convergence criteria are not met, the CDMA planner repeats the calculations performed in steps 110 through 114 until the convergence criteria is satisfied. Once the convergence criteria are satisfied, the analysis continues to step 118.

At step 118, the CDMA planner determines whether a predetermined number of trials have been performed. If not, the CDMA planner increments an internal counter at step 120 and generates a new set of subscriber units that is used to perform reverse link analysis and forward link analysis for the next trial. This process is repeated until a predetermined number of trials are completed. After the predetermined number of trials is completed, the CDMA planner outputs performance data at step 122 and the analysis ends at step 124.

The output data may take a variety of forms. For example, the CDMA planner may generate a variety of individual plots showing reverse link and forward link service areas, mobile transmit power for each bin, path loss, handoff maps, loading, total transmit power, and many other operating design plots. Other plots, such as subscriber distribution, custom demand, etc., may also be generated by the CDMA planner. Additionally, the CDMA planner may generate statistical data including mean and standard deviations computed from multiple iterations, which may be used to analyze performance of the CDMA network. In association with some of the generated plots, the CDMA planner may also provide features such as a "spider cursor" that provides information based on cursor location, and bin query, all of which help the user in obtaining more detailed information from the CDMA planner output.

Figure 2:
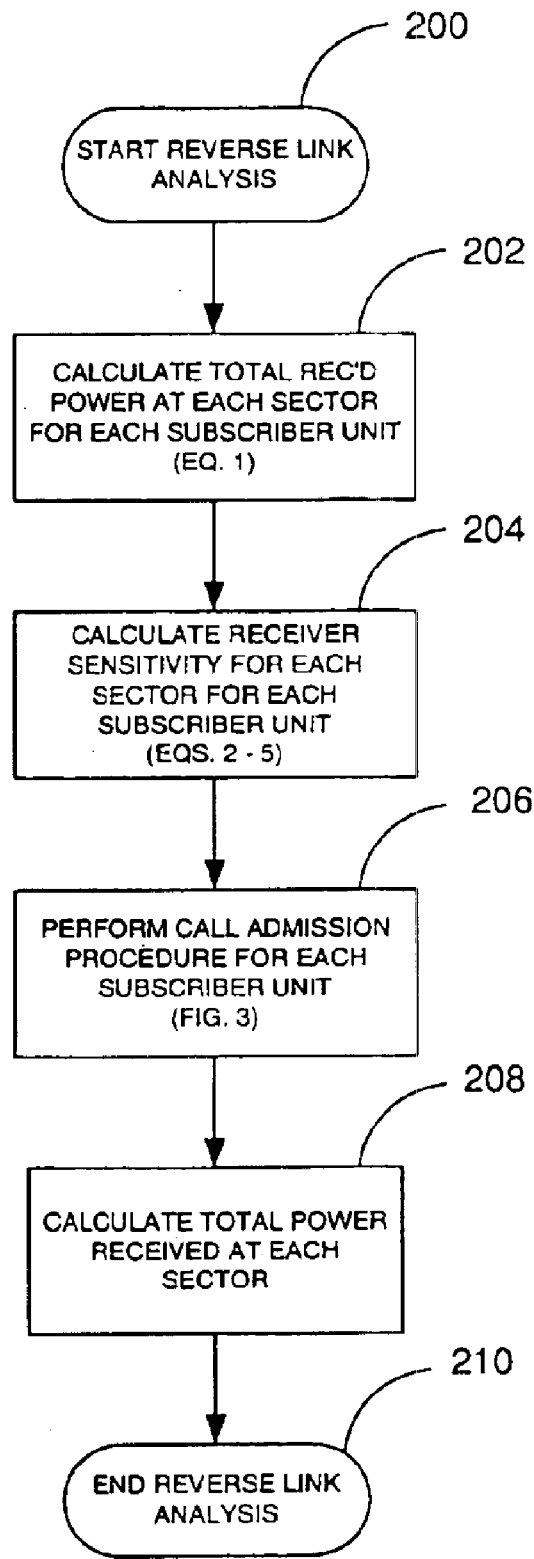
FIG. 2 is a flow diagram overview of iterative reverse link analysis.

FIG. 2 is a flow diagram illustrating how the CDMA planner performs reverse link analysis. The reverse link analysis procedure of FIG. 2 begins at step 200. At step 202, the CDMA planner calculates the total received power at each sector k as shown in Eq. 1 below:

$$P_{tr}^c(k, im(ibin, f_i)f_i) = \frac{(N_o W)N_f^c(k) + EI(k, im(ibin, f_i)f_i)}{1 - X(k, im(ibin, f_i)f_i)} \quad \text{(Eq. 1)}$$

The variables used in Eq. 1 are defined as follows:
$N_o$=thermal noise density (Watts/Hz);
W=system transmission bandwidth (Hz);
$N_f(k)$=receiver noise figure at sector k;
$EI(k,F_i)$=external interference;
$X(k,im(ibin,f_i),f_i)$=reverse link load;
$f_i$=channel center frequency.

The thermal noise density $N_o$ and system transmission bandwidth W are system parameters input by the user. The receiver noise figure $N_f(k)$, and the external interference $EI(k,im(ibin,f_i)f_i)$ are sector-dependent parameters. The value of the receiver noise figure $N_c(k)$ is input by the user to begin the CDMA analysis. The external interference $EI(k,im(ibin,f_i)f_i)$ represents the noise provided by external sources at sector k. The reverse link load is a fixed percentage value defined by the user.

After computing the total received power at each sector, the CDMA planner calculates at step 204 the receiver sensitivity at the radio base station in each sector k for all of the reverse link channels (e.g., reverse pilot, fundamental, and supplemental or supplemental code channel, each channel per individual subscriber) supported by the simulation. Different processing gains and bit energy-to-noise $$\left(\frac{E_b}{N_t}\right)$$

ratios for different applications and also for different channels will result in different receiver sensitivities for different subscriber units. The CDMA planner calculates the receiver sensitivity and stores the calculated values per reverse channel and per subscriber unit. The calculated values may be stored as a matrix that can be updated through subsequent iterations.

The CDMA planner calculates the receiver sensitivity for each reverse channel for each subscriber according to Equations 2–5 below.

$$S^C R - FCH(k, im(ibin, f_i)) = \qquad \text{(Eq. 2)}$$
$$\frac{R_{set\_rvs}(im(ibin, f_i))}{W}\left(\frac{E_b}{N_t}\right)^c_{req\_R-FCH}(im(ibin, f_i))_n \cdot$$
$$P_{tr}^c(k, im(ibin, f_i))_n$$

$$S^C R - SCH(k, im(ibin, f_i)) = \qquad \text{(Eq. 3)}$$
$$\frac{R_{set\_rvs}(im(ibin, f_i))}{W}\left(\frac{E_b}{N_t}\right)^c_{req\_R-SCH}(im(ibin, f_i))_n \cdot$$
$$P_{tr}(k, im(ibin, f_i))_n$$

$$S^c R - SCCH(k, im(ibin, f_i)) = \qquad \text{(Eq. 4)}$$
$$\frac{R_{set\_rvs}(im(ibin, f_i))}{W}\left(\frac{E_b}{N_t}\right)^c_{req\_R-SCCH}(im(ibin, f_i))_n \cdot$$
$$P_{tr}(k, im(ibin, f_i))_n$$

$$S^c R - PICH(k, im(ibin, f_i)) = \qquad \text{(Eq. 5)}$$
$$\left(\frac{E_c}{I_o}\right)^c_{req\_R-PICH}(ib(ibin, f_i))_n \cdot P_{tr}(k, im(ibin, f_i))_n$$

The variables used in the sensitivity calculations in Equations 2–5 are defined below.

$$\left[\frac{E_c}{I_o}\right]^c_{\text{req\_R-PICH}}(im(ibin, f_i))_n$$

is the chip energy ($E_c$) to total interference ($I_o$) ratio for reverse pilot channel. Interference is defined as $I_o = \hat{I}_{or} + I_{oc} + N_o$ $$\left[\frac{E_b}{N_t}\right]^c_{\text{req\_R-FCH}}(im(ibin, f_i))_n$$

is the bit energy ($E_b$) to total noise ($N_t$) for reverse fundamental channel. Total noise is defined as $N_t = I_{oc} + N_o$ $R_{set\_rvs}(im(ibin, f_i))_n$ is the reverse link data rate requested by the application associated with the subscriber unit. This value is identical to application peak data rate.

The chip energy to total interference $$\left(\frac{E_c}{I_o}\right)$$

and bit energy to total noise $$\left(\frac{E_b}{N_t}\right)$$

ratios are subscriber-dependent variables determined by the subscriber type for a particular subscriber unit. The maximum and minimum reverse link data rate, likewise, are subscriber-dependent variables dependent upon the subscriber type for a subscriber unit and the application supported. These values are input by the user.

If the subscriber unit supports turbo-coding, then a corresponding correction factor should be applied to the bit energy to noise $$\left(\frac{E_b}{N_t}\right)$$

ratios. Turbo-coding is expected to be used for high data rate subscriber applications. Therefore, a turbo-code correction factor for each data rate and frame length case may be employed to compensate for coding gains. Preferably, in at least some embodiments of the CDMA planner, multiple turbo coding scenarios can be supported depending upon which link can support it.

At step 206, the CDMA planner executes a call admission procedure for each subscriber unit. The purpose of the call admission procedure is to determine which subscriber units can establish a reverse link connection with which sectors k. Those subscriber units unable to establish a reverse link connection with any sector k are dropped from subsequent calculations. The call admission procedure also determines if the data rate requested by the subscriber unit can be supported or not. If not, the reverse link analysis includes a fall-back negotiation to adjust the data rate.

At step 208, the planner calculates total power received at each sector and the reverse link analysis ends at step 210.

Figure 3:
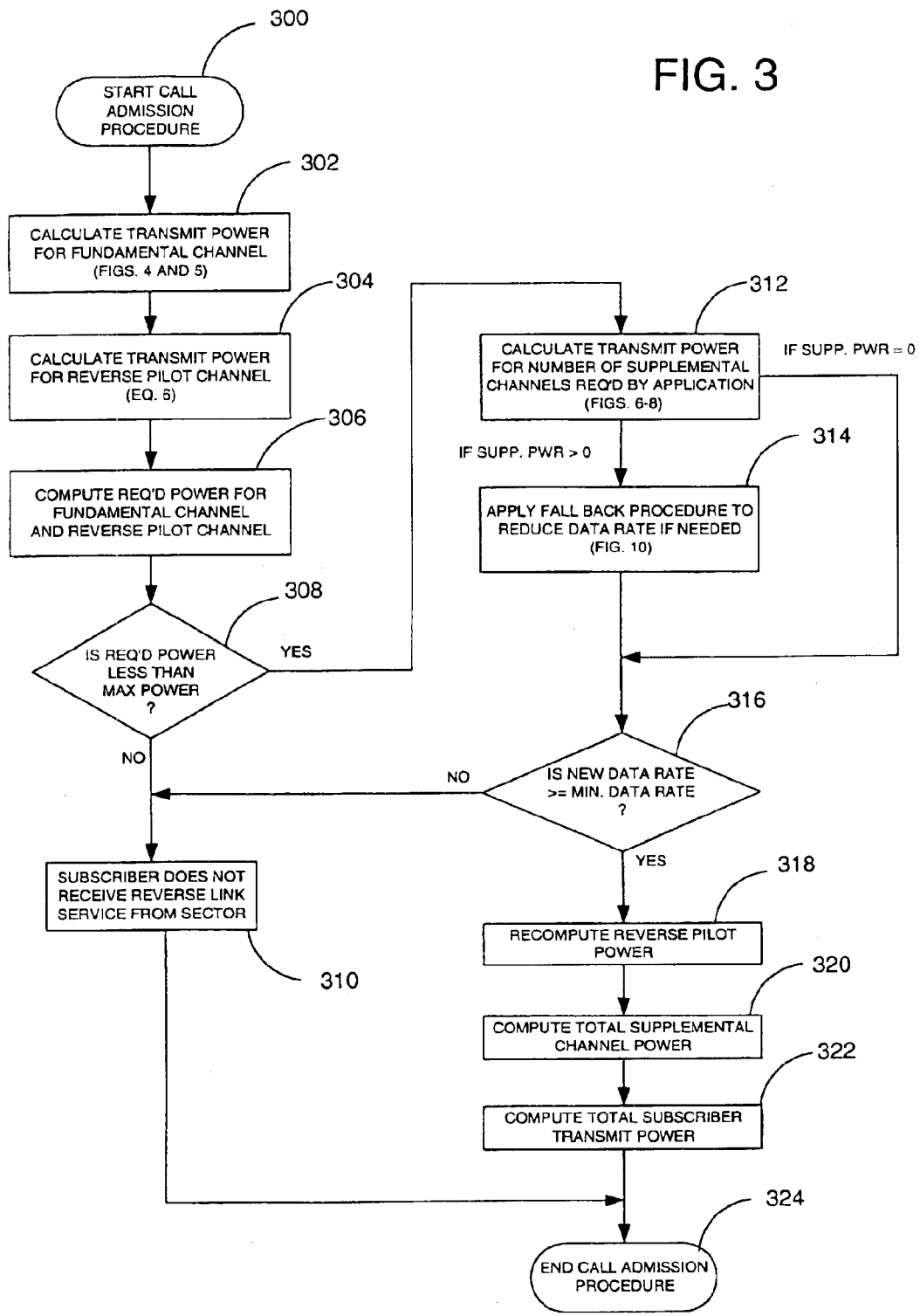
FIG. 3 is a flow diagram overview of reverse link call admission.

FIG. 3 illustrates the call admission procedure in more detail. The call admission procedure begins at step 300. At step 302, the CDMA planner calculates the transmit power required for the fundamental channel to close the reverse link with each sector k given the receiver sensitivities calculated in step 204 of FIG. 2. The receiver sensitivity represents the minimum received power need to detect and successfully demodulate a received signal. Thus, in step 302, the CDMA planner calculates the minimum transmit power necessary for the subscriber unit to transmit an acceptable signal to each sector k. It is assumed that the minimum amount of power is used since the power control algorithms implemented in IS-2000 will inherently reduce subscriber unit transmit power levels to the minimum necessary.

Using the transmit power for the fundamental channel computed in step 302, the CDMA planner calculates the transmit power for the reverse pilot channel at step 304. As defined in the TIA/EIA IS-2000A standard, a subscriber unit must maintain a defined ratio between its mean code channel output power (i.e., the reverse fundamental channel and the reverse supplemental channel or the dedicated control channel) and its mean pilot channel output power. The code channel output power to pilot channel output power ratio is defined as the mean code channel output power divided by the mean pilot channel output power. The CDMA planner uses the same ratio to calculate the reverse link pilot power from the power computed for the fundamental channel at step 302 as shown in Eq. 6 below:

$$(P_{R\text{-}PICH}{}^m)_n = (P_{code\text{-}channel}{}^m)_n \cdot C \qquad \text{Eq. 6}$$

In Equation 6, the variable $P_{code\text{-}channel}{}^m$ refers to the transmit power for the code channel. In step 304, the code channel transmit power $P_{code\text{-}channel}{}^m$ is set equal to the transmit power of the fundamental channel. The power calculated in step 304 is then updated in step 318. Computation of the output power ratio shown in Equation 6 is covered in detail in the TIA/EIA IS-2000 standard and is, therefore, not described in detail herein. Those interested in how to compute the output power ratio are referred to the standard TIA/EIA IS-2000.2a, Physical Layer Standard for cmda2000 Spread Spectrum Systems, Section 2.1.2.3.3.2, which is incorporated herein by reference.

At step 306, the CDMA planner sums the transmit power computed for the fundamental channel in step 302 and the transmit power for the reverse pilot channel computed in step 304 to compute the minimum required power to close the reverse link with sector k. At step 308, the minimum required power is compared to the maximum transmit power allowed for the subscriber unit to confirm that the subscriber unit has enough power to support the reverse pilot channel and fundamental channel. If the subscriber unit does not have enough power to support the reverse pilot channel and fundamental channels simultaneously, then that particular subscriber unit will not receive service from the sector k and this information is saved by the CDMA planner at step 310. The subscriber unit may still be able to close a reverse link with another sector k. If the subscriber unit is unable to support the reverse pilot channel and fundamental channel within the limits of its transmit power for any sector k, that subscriber unit is dropped from subsequent calculations.

Figure 6:
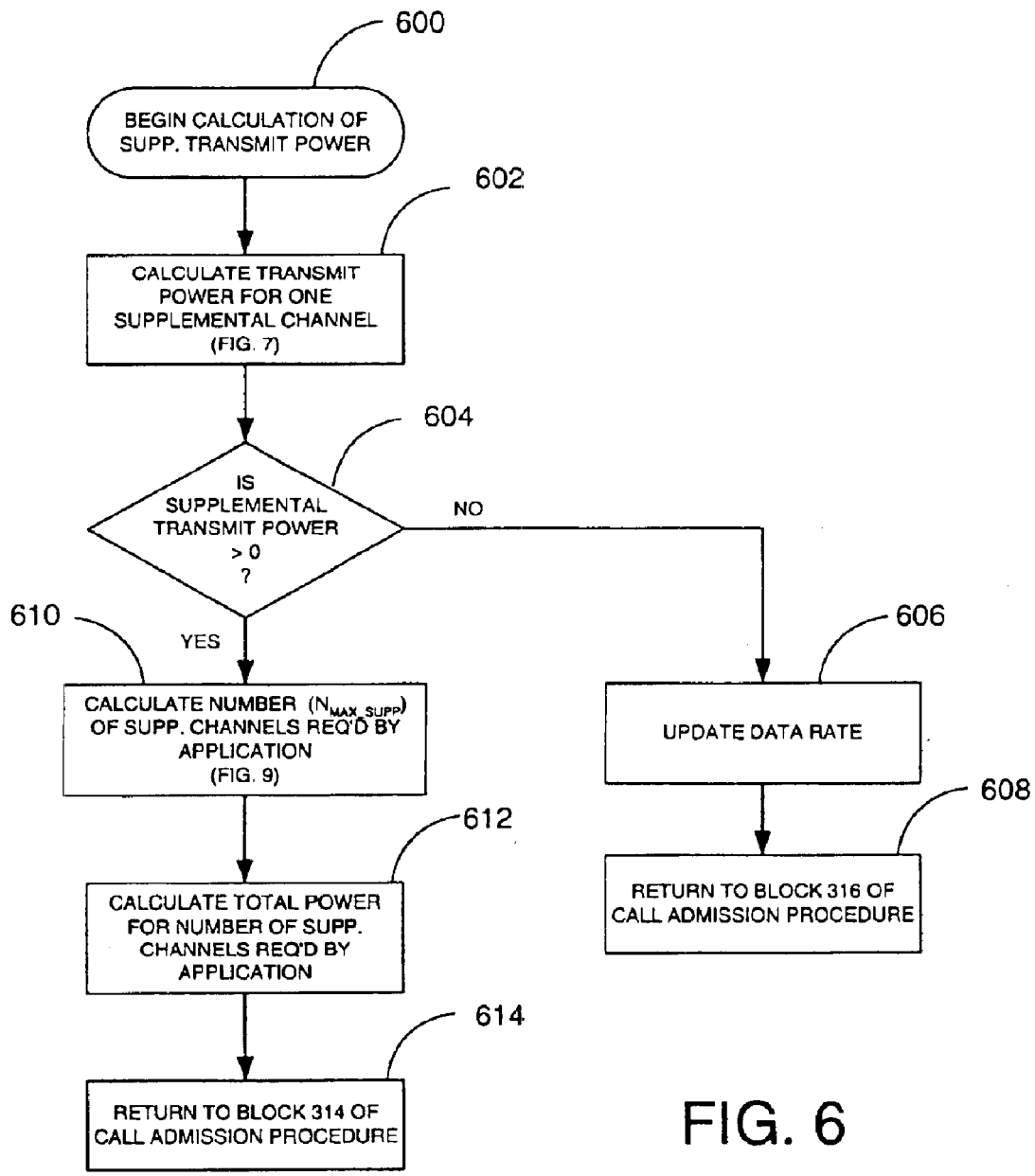
FIG. 6 is a flow diagram of reverse link supplemental channel transmit power calculations.
Figure 7:
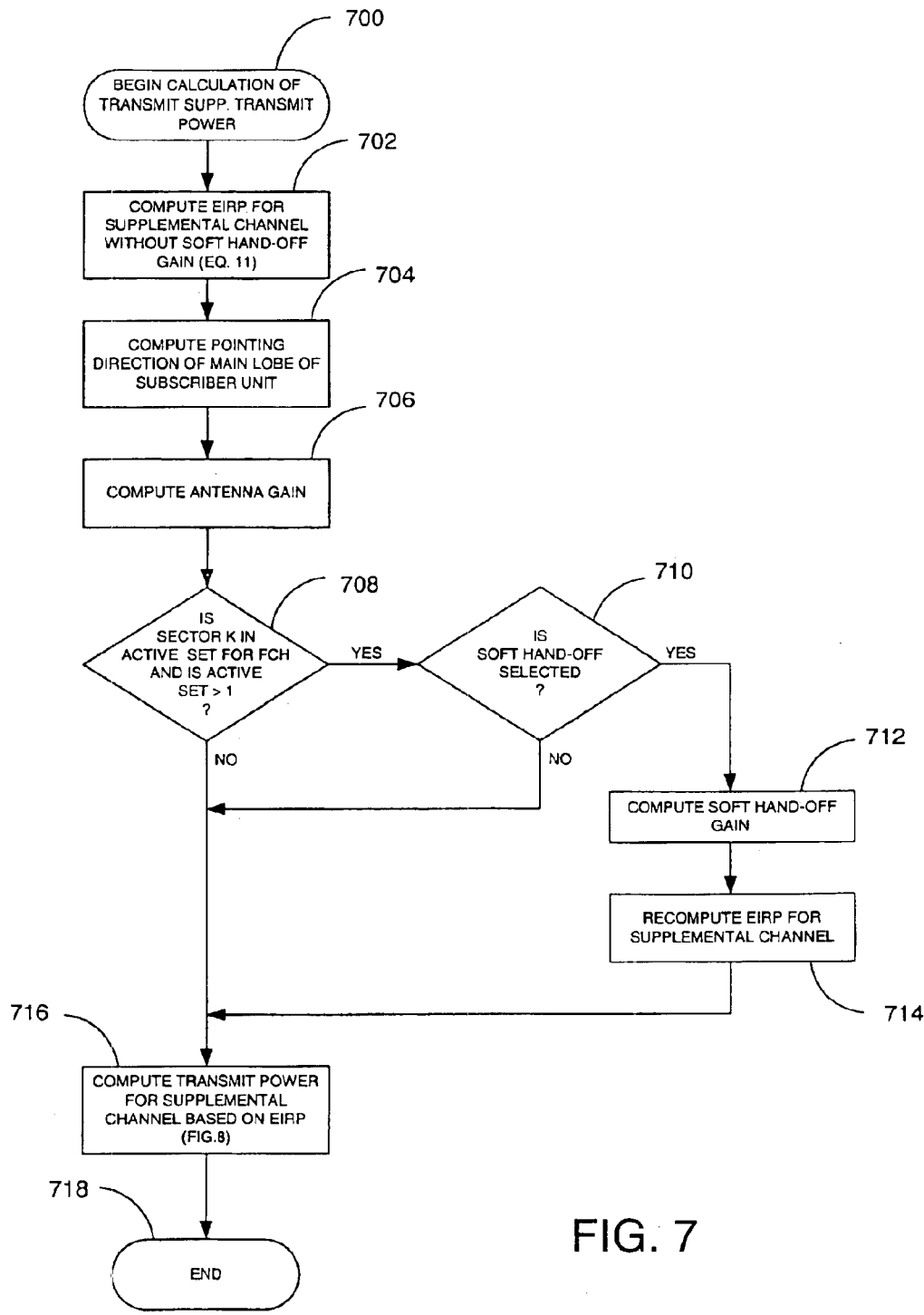
FIG. 7 is a flow diagram of reverse link supplemental channel power on a per channel basis.
Figure 8:
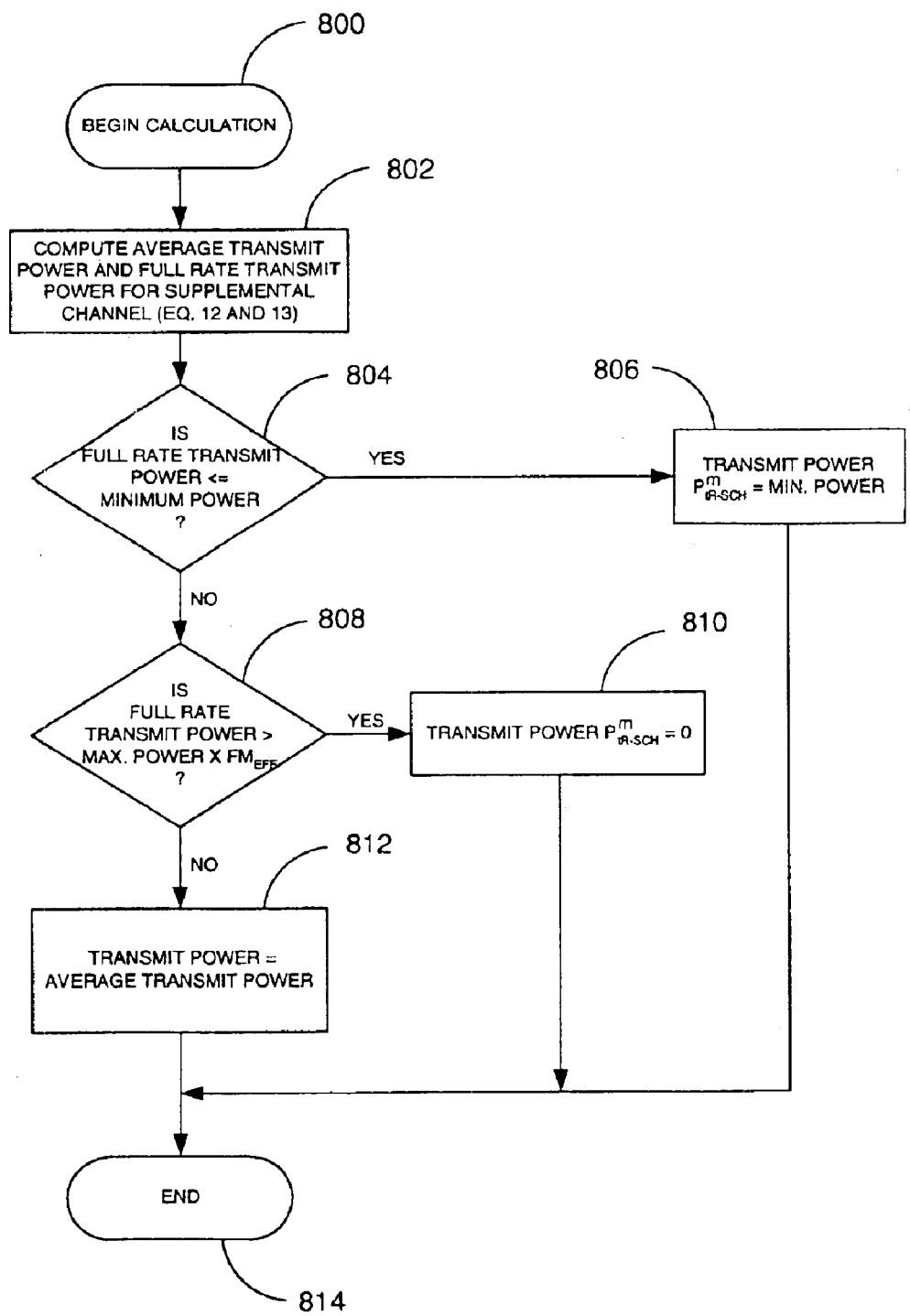
FIG. 8 is a flow diagram of upper and lower bounding applied to supplemental channel power calculation results.

At step 312, the CDMA planner calculates the transmit power for the number of supplemental channels required by the application associated with the subscriber unit. Calculation of the transmit power for the supplemental channel is shown in FIGS. 6–8. Under the TIA/EIA IS-2000A standard, a subscriber unit may have more than one supplemental channel. As will be explained more fully below, the CDMA planner calculates the transmit power for a single supplemental channel and determines the number of supplemental channels required by the application. The total transmit power for the supplemental channel is then computed as the product of the transmit power for a single supplemental channel and the number of supplemental channels that is needed for the application.

The above procedure works for Radio Configurations 1 and 2 (RC1 and RC2), where the supplemental channels are supplemental code channels (SCCHs) that require the same amount of power. For Radio Configurations 3 and 4 (RC3 and RC4), which use supplemental channels (SCH) rather than SCCHs, the same assumption may not be made. That is, each SCH may require a different power because they may support different data rates and therefore require different Eb/Nt values, which result in different sensitivities for each SCH. Thus, for SCH power calculation, power may be calculated separately for each supplemental channel. Selection of radio configurations for simulation purposes are discussed later herein.

If the transmit power for the supplemental channel computed in step 312 is greater than zero, the procedure continues to step 314. It is possible that the transmit power computed in step 312 will be zero. This may occur when the power needed for a single supplemental channel exceeds the maximum transmit power for the subscriber unit. In this case, the subscriber unit data rate is updated to the level supported by the fundamental channel without any supplemental channels and the procedure continues to step 316.

Figure 10:
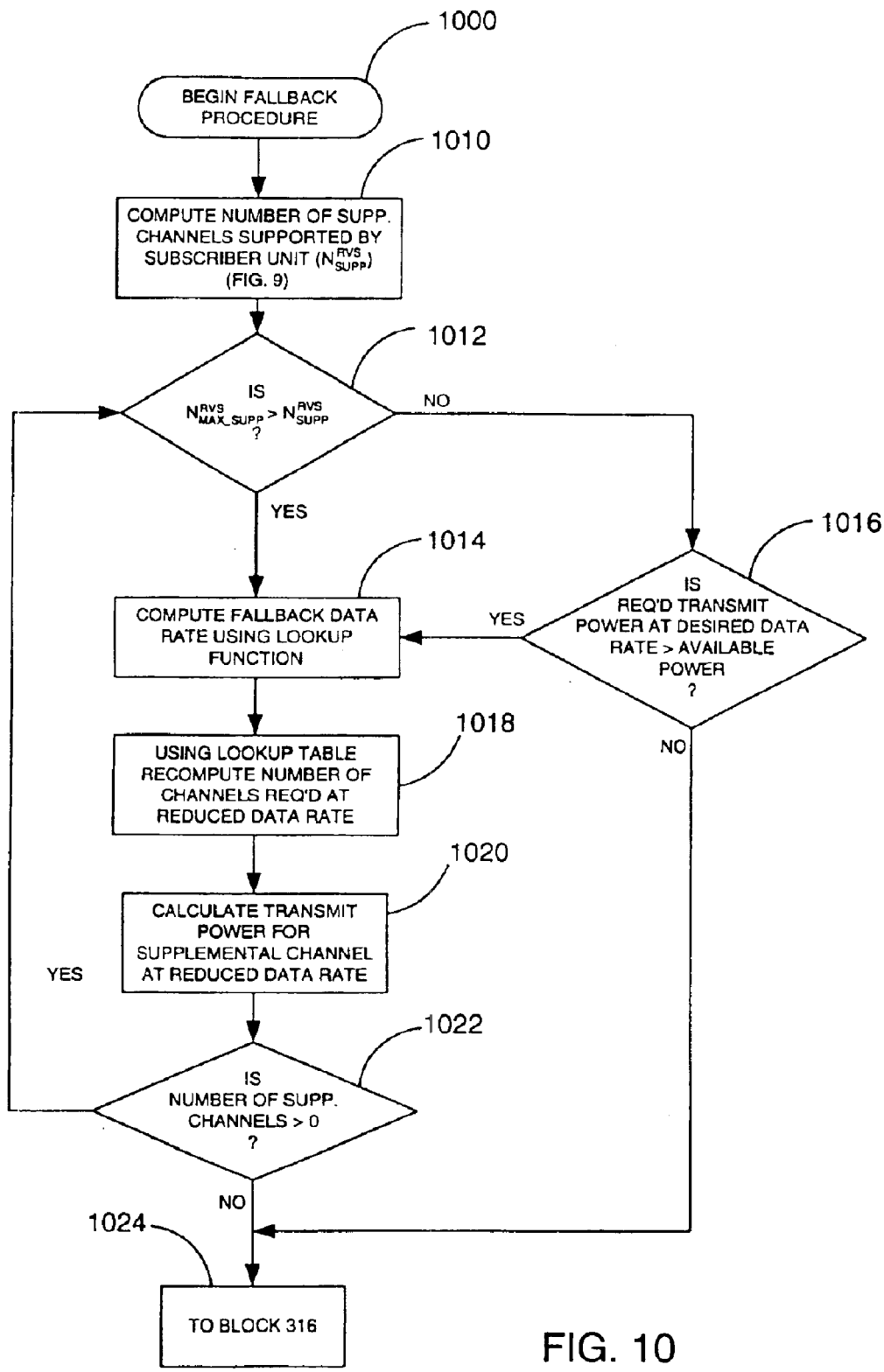
FIG. 10 is a flow diagram of reverse link fall back procedures.

At step 314, the CDMA planner executes a fallback procedure that reduces the requested peak data rate for a particular subscriber unit when the subscriber unit is not able to support the data rate requested for the application associated with that subscriber unit. To support a given data rate, the subscriber unit must support a certain number of supplemental channels at certain data rates. The fallback procedure is shown in FIG. 10. The fallback procedure incrementally reduces the data rate until it reaches a data rate that can be supported by the subscriber unit, or until the number of supplemental channels is reduced to zero.

At step 316, the CDMA planner determines whether the data rate, which may be adjusted by the fallback procedure, is greater than or equal to the minimum allowed data rate for the application associated with a particular subscriber unit. If not, the subscriber unit does not receive reverse link service from the sector k (step 310) and the procedure ends (step 324). If the data rate is greater than the minimum allowed data rate, the CDMA planner re-computes the reverse pilot power at step 318, taking into account the peak data rate of the supplemental channels that can be supported by the subscriber unit. At step 320, the CDMA planner computes the total supplemental channel power for the subscriber unit. At step 322, the CDMA planner computes power required for all channels and the reverse link analysis ends at step 330.

Figure 4:
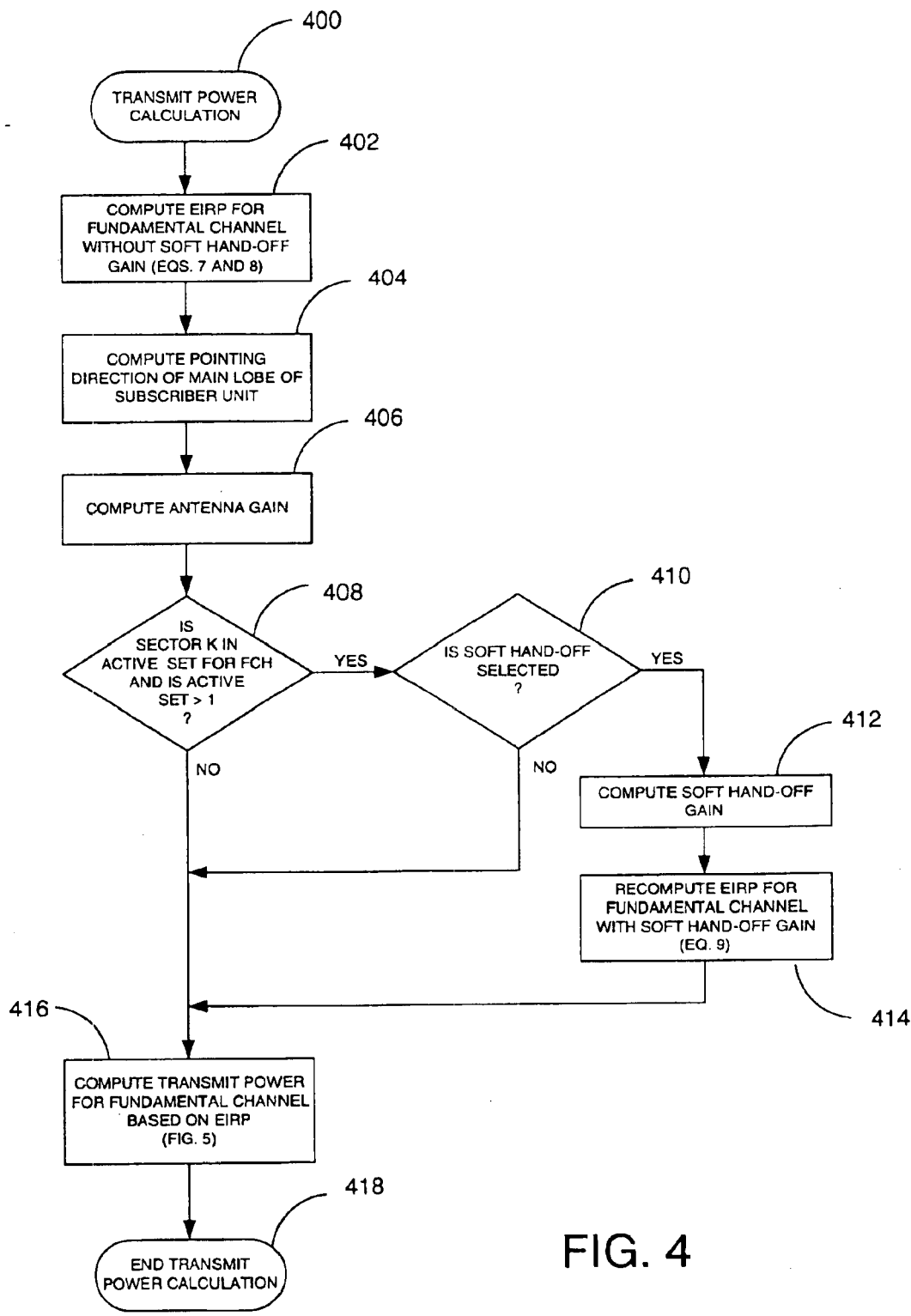
FIG. 4 is a flow diagram of reverse link fundamental channel transmit power calculations.

FIG. 4 is an overview of how the CDMA planner calculates the transmit power for the fundamental channel. The flow chart of FIG. 4 corresponds to block 302 in FIG. 3. The calculation of the transmit power for the fundamental channel begins at step 400. At step 402, the CDMA planner calculates the Effective Isotropic Radiated Power (EIRP) for the fundamental channel without soft hand-off gain according to Equation 7 below:

$$R-\text{FCH\_EIRP}^m_{\text{without\_SHG}}(k, im(ibin, f_i))_n = \quad \text{(Eq. 7)}$$

$$\frac{S^c_{R-FCH}(k, im(ibin, f_i))_n}{PL^m_c(k, ib(ibin, f_i))_n} \cdot \gamma_{R-FCH}$$

In Equation 7, the term $PL_c^m(k)im(ibin,f_i))_n$ represents the total path loss calculated from the subscriber unit to sector k. The path loss from each sector k to each subscriber unit may be calculated before beginning the reverse link analysis and stored in a matrix. Path loss is calculated as shown in Equation 8 below:

$$PL_T^m(k, im(ibin, f_i))_n = L^c_{f,r}(k) G_r(k, im(ibin, f_i))_n \cdot \quad \text{(Eq. 8)}$$

$$L_P(k, im(ibin, f_i))_n \cdot L_b^m(im(ibin, f_i))_n \cdot$$

$$L^m_{penet}(im(ibin, f_i)) \times \text{HAAT\_cor}(k, im(ibin, f_i))_n$$

$$\text{Random\_LG}(im(ibin, f_i))_n$$

The terms in Equation 8 have the following meaning:

$L_p(k,ix,iy)$ is the propagation loss from the sector antenna to the subscriber antenna plus any land use or sector RF correction.

$L_{f,r}^c(k)$ is the sector feeder loss in the receive path.

$G_r(k,ix,iy,j)$ is the sector receive antenna gain from the position of the subscriber, $L_b^m(im(ibin,f_i))$ is the body loss for a particular type of subscriber.

$L_{penet}^m(im(ibin,f_i))$ is the penetration loss for a given subscriber type.

$\gamma_{R-FCH_n}$ represents the reverse link activity factor for the reverse fundamental channel.

Returning to the process flow of FIG. 4, the CDMA planner computes the pointing direction of the main lobe of the subscriber antenna unit at step 404. In this step, it is assumed that the subscriber unit antenna is a directional antenna. The sector that requires the minimum $\text{EIRP}_{without\_SHG}^m(K,im(ibin,f_i))_n$ defines the direction toward which a subscriber with a directional antenna should point. This implies that the maximum gain of the mobile station is used to decide the pointing direction. The subscriber antenna gain in the pointing direction, defined as $G^m(k,\theta_{point}(im,ibin,f_i))$, is then computed at step 406. This computation is based on the sector k with the minimum EIRP without soft hand-off gain.

Figure 5:
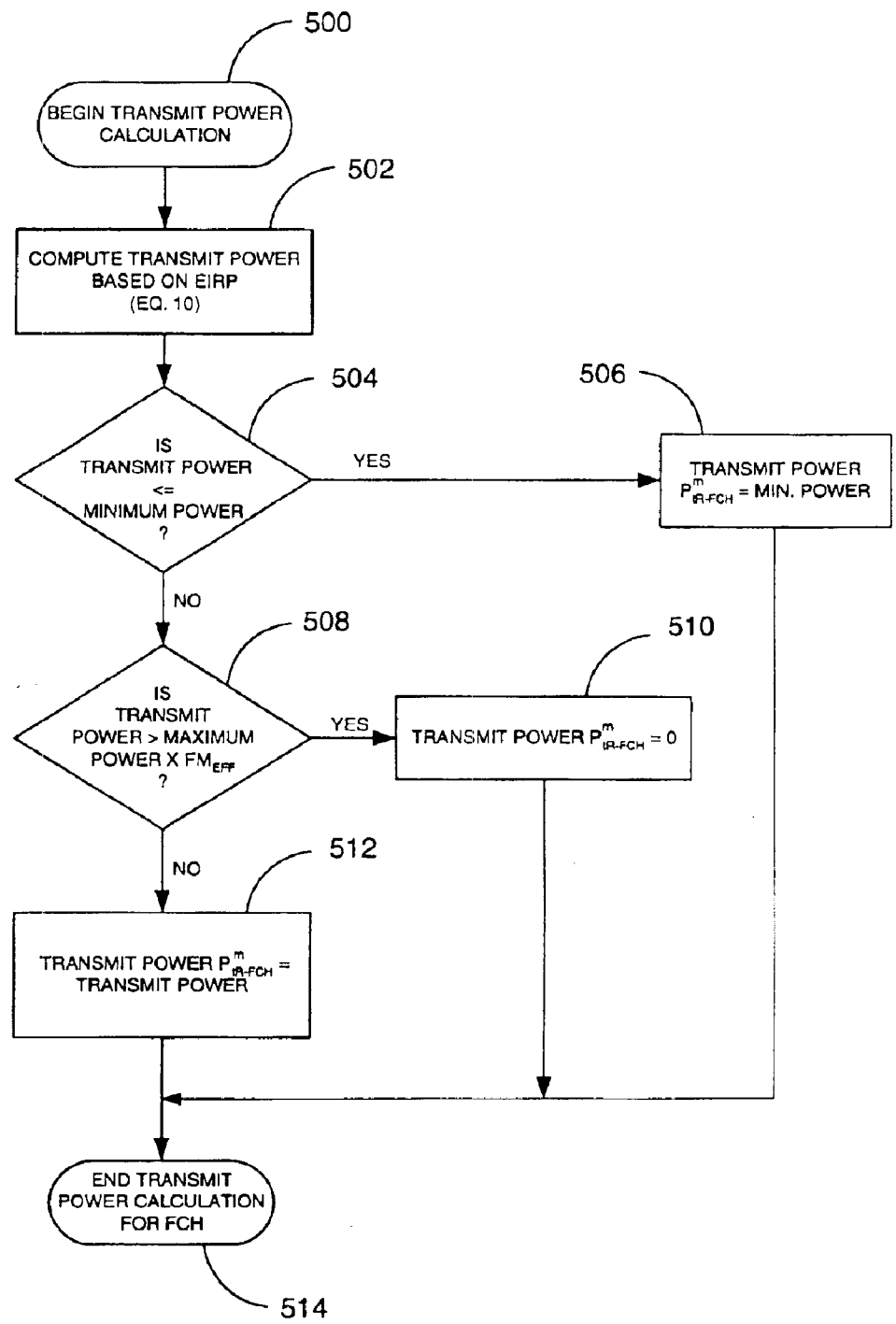
FIG. 5 is a flow diagram of power bounding applied to the calculation results of FIG. 4.

At step 408, the CDMA planner determines whether a sector k is in the active set for the particular subscriber unit considered and determines whether the size of the active set is greater than "1." If not, the CDMA planner computes the transmit power $P_{t_{R-FCH}}^m$ for the reverse fundamental channel at step 416 based on the EIRP computed in step 402. This calculation is shown in FIG. 5. If sector k is in the active set for the subscriber unit and the active set is greater than "1," the CDMA planner then determines at step 410 whether the soft hand-off gain option was selected by the user of the CDMA planner. This is an optional setting for the CDMA planner application. If the soft hand-off gain option was selected, the CDMA planner computes the soft hand-off gain at step 412 and then re-computes the EIRP for reverse the fundamental channel at step 414 taking soft hand-off gain into account as shown in Eq. 9 below:

$$R-\text{FCH\_EIRP}^m(k, im(ibin, f_i))_n = \quad \text{(Eq. 9)}$$

$$\frac{S^c_{R-FCH}(k, im(ibin, f_i))_n}{PL^m_T(k, im(ibin, f_i))_n \cdot SHG(im(ibin, f_i))_n} \cdot \gamma_{R-FCH_n}$$

In Eq. 9 the variable $SHG(im(ibin,f_i))$ represents the soft hand-off gain for a particular subscriber type in a particular location. At step 414, the CDMA planner then computes the transmit power for the reverse fundamental channel $P_{t_{R-FCH}}^m(k,im(ibin,fi))$.

FIG. 5 shows how the final value of the subscriber unit transmit power $P_{t_{R-FCH}}^m$ for the reverse fundamental channel is calculated. The calculation begins at step 500. At step 502, the CDMA planner computes the transmit power for the reverse fundamental channel according to Equation 10 below:

$$P_{R-FCH}(k, im(ibin, f_i))_n = \frac{R-FCH\_EIRP^m(k, im(ibin, f_i))_n}{L_f^m(im(ibin, f_i))_n \cdot G^m(k, \theta_{point}(im(ibin, f_i))_n)} \cdot \gamma_{R-FCH_n} \quad \text{(Eq. 10)}$$

In Equation 10, the EIRP for the fundamental channel is divided by the subscriber unit feeder loss $L_f^m$, which is a user input, and antenna gain $G^m$ for the subscriber unit computed in step 406, and then multiplied by the activity factor $\gamma_{R-FCH}$ for the reverse fundamental channel.

At step 504, the CDMA planner determines whether the transmit power is below or equal to the minimum transmit power for the subscriber unit. If so, the transmit power $P_{t_{R-FCH}}^m$ for the reverse fundamental channel is set equal to the minimum subscriber transmit power at step 506 and the procedure ends at step 514. If the transmit power computed in step 502 is above the minimum power level for the subscriber unit, the CDMA planner then determines at step 508 whether the transmit power is greater than the maximum transmit power level for the subscriber unit multiplied by the effective fade margin ($FM_{eff}$). If so, the transmit power $P_{t_{R-FCH}}^m$ for the reverse fundamental channel is set equal to zero at step 510 and the procedure ends at step 514. If the transmit power is less than or equal to the maximum power level for the subscriber unit multiplied by the effective fade margin ($FM_{eff}$), the transmit power $P_{t_{R-FCH}}^m$ is set equal to the transmit power level computed in block 502 and the procedure ends.

FIGS. 6 through 8 illustrate the calculation of the reverse supplemental transmit power for the number of reverse supplemental channels required by an application run by the subscriber unit. FIG. 6 corresponds to step 312 of FIG. 3. The calculation of the reverse supplemental transmit power begins at step 600. At step 602, the CDMA planner calculates the transmit power for one supplemental channel. This calculation is shown in FIGS. 7 and 8 and it is described in more detail below. At step 604, the CDMA planner determines whether the supplemental channel transmit power calculated in step 602 is greater than zero. A transmit power of zero implies that the subscriber unit does not have sufficient power to successfully transmit data on the reverse supplemental channel to the base station. In that case, the CDMA planner updates the data rate at step 606 to the level supported by the fundamental channel only and processing returns to step 316 of the call admission procedure shown in FIG. 3.

If the transmit power is greater than zero, the CDMA planner calculates at step 610 the number of reverse supplemental channels required by the application associated with that subscriber unit at the peak data rate. At step 612, the CDMA planner calculates the total power for the supplemental channel by multiplying the transmit power computed in step 602 times the number of supplemental channels required by the application computed in step 610. As explained before, this approach is appropriate for RC1 and RC2, where the supplemental channels concerned are SCCHs. For RC3, RC4, or RC5, the power is calculated for each reverse supplemental channel (SCH) and summed. This might, for example, entail implementing the complete process of FIG. 7 for each supplement channel.

After computing the total power for the number of supplemental channels required by the application, processing returns to block 314 of the call admission procedure shown in FIG. 3 (step 614).

The Number $N_{MAX-SUPP}$ required by a particular application may, for example, be determined by reference to a look-up table. By way of example, the look-up table may have the structure shown in Table 1 below.

| Column/Row | RC<br>A | Channel<br>B | Number of<br>Channels<br>C | Peak Data<br>Rate [kbps]<br>D | Offered Data Rate<br>[kpbs]<br>E | Channel Data<br>Rate [kbps]<br>F | Number of<br>Channels<br>G |
|---|---|---|---|---|---|---|---|
| 1 | RC 1 | R-FCH | 1 | 9.6 | 9.60 | 9.6 | 1 |
| 2 | | R-SCCH | 1 | 9.6 | 19.20 | 9.6 | 2 |
| 3 | | | 2 | 9.6 | 28.80 | 9.6 | 3 |
| 4 | | | 3 | 9.6 | 38.40 | 9.6 | 4 |
| 5 | | | 4 | 9.6 | 48.00 | 9.6 | 5 |
| 6 | | | 5 | 9.6 | 57.60 | 9.6 | 6 |
| 7 | | | 6 | 9.6 | 67.20 | 9.6 | 7 |
| 8 | | | 7 | 9.6 | 76.80 | 9.6 | 8 |
| 9 | RC 2 | R-FCH | 1 | 14.4 | 14.40 | 14.4 | 1 |
| 10 | | R-SCCH | 1 | 14.4 | 28.80 | 14.4 | 2 |
| 11 | | | 2 | 14.4 | 43.20 | 14.4 | 3 |
| 12 | | | 3 | 14.4 | 57.60 | 14.4 | 4 |
| 13 | | | 4 | 14.4 | 72.00 | 14.4 | 5 |
| 14 | | | 5 | 14.4 | 86.40 | 14.4 | 6 |
| 15 | | | 6 | 14.4 | 100.80 | 14.4 | 7 |
| 16 | | | 7 | 14.4 | 115.20 | 14.4 | 8 |
| 17 | RC 3 | R-FCH | 1 | 9.6 | 9.60 | 9.6 | 1 |
| 18 | | R-SCH | 2 | 307.2 | 19.20 | 9.6 | 2 |
| 19 | | | | | 28.80 | 19.2 | 2 |
| 20 | | | | | 48.00 | 38.4 | 2 |
| 21 | | | | | 86.40 | 76.8 | 2 |
| 22 | | | | | 163.20 | 153.6 | 2 |
| 23 | | | | | 316.80 | 307.2 | 2 |
| 24 | | | 3 | 307.2 | 326.40 | 9.6 | 3 |
| 25 | | | | | 336.00 | 19.2 | 3 |
| 26 | | | | | 355.20 | 38.4 | 3 |
| 27 | | | | | 393.60 | 76.8 | 3 |
| 28 | | | | | 470.40 | 153.6 | 3 |
| 29 | | | | | 624.00 | 307.2 | 3 |
| 30 | RC 4 | R-FCH | 1 | 14.4 | 14.40 | 14.4 | 1 |

-continued

| Column/Row | RC A | Channel B | Number of Channels C | Peak Data Rate [kbps] D | Offered Data Rate [kpbs] E | Channel Data Rate [kbps] F | Number of Channels G |
|---|---|---|---|---|---|---|---|
| 31 | | R-SCH | 2 | 230.4 | 28.80 | 14.4 | 2 |
| 32 | | | | | 43.20 | 28.8 | 2 |
| 33 | | | | | 72.00 | 57.6 | 2 |
| 34 | | | | | 129.60 | 115.2 | 2 |
| 35 | | | | | 244.80 | 230.4 | 2 |
| 36 | | | 3 | 230.4 | 259.20 | 14.4 | 3 |
| 37 | | | | | 273.60 | 28.8 | 3 |
| 38 | | | | | 302.40 | 57.6 | 3 |
| 39 | | | | | 360.00 | 115.2 | 3 |
| 40 | | | | | 475.20 | 230.4 | 3 |

As shown in Table 1, the look-up table includes a column corresponding to the radio configuration of the subscriber unit, a column corresponding to the desired peak data rate, and a column corresponding to the number of channels. The first two columns are used as an index by a look-up function. The look-up function receives the radio configuration and desired peak data rate as inputs, and returns the number of channels corresponding to the inputs. It should be noted that the above table was designed using the TIA/EIA IS-2000A standard as a guideline regarding allowed number of channels, radio configurations, and data rates. The same approach may be used to implement the different frame sizes mentioned in the TIA/EIA IS-2000A standard for supplemental channels.

FIG. 7 illustrates the procedure used to calculate the transmit power $P_{t_{R\_SCH}}^m$ for a single reverse supplemental channel. This procedure corresponds to step 602 of FIG. 6. Calculation of the transmit power for the supplemental channel begins at step 700. At step 702, the CDMA planner computes the EIRP for a single supplemental channel as shown in Equation 11 below:

$$R-SCH\_EIRP_{without\_SHG}(k, im(ibin, f_i))_n = \frac{S^C_{R-SCH}(k, im(ibin, f_i))_n}{PL^m_T(k, im(ibin, f_i))_n} \quad (Eq. 11)$$

At step 704, the CDMA planner determines the pointing direction of the main lobe of the subscriber unit antenna. In this step, it is assumed that the subscriber unit antenna is a directional antenna. The sector that requires the minimum $EIRP_{without\_SHG}^m(K,im(ibin,f_i))_n$ defines the direction toward which a subscriber with a directional antenna should point. This implies that the maximum gain of the mobile station is used to decide the pointing direction. The subscriber antenna gain in the pointing direction, defined as $G^m(k,\theta_{point}(im,ibin,f_i))$, is then computed at step 706. This computation is based on the sector k with the minimum EIRP without soft hand-off gain.

At step 708, the subscriber unit determines whether the sector k is in the active set for the supplemental channel and whether the active set has more than one member. If not, the CDMA planner computes the transmit power $P_{t_{R\_SCH}}^m$ for the reverse supplemental channel based on the EIRP computed in step 702. Note that the CDMA planner assumes that the active set of the fundamental and supplemental channels is the same for the reverse link.

If the sector k is in the active set and the active set is greater than "1," then the process flow continues to block 710. At block 710, the CDMA planner determines whether the soft hand-off option has been selected. If not, the transmit power $P_{t_{R\_SCH}}^m$ for the reverse supplemental channel is computed based on the EIRP calculated in step 702. If the soft hand-off option is selected, the CDMA planner computes the soft hand-off gain at step 712 and then re-computes the EIRP for the supplemental channel, taking into account the soft hand-off gain at step 714. In this case, the process flow then proceeds to block 716 where the CDMA planner computes the transmit power $P_{t_{R\_SCH}}^m$ for the reverse supplemental channel based on the EIRP with soft hand-off gain computed in step 714. Calculation of the transmit power for the reverse supplemental channel ends at step 718.

FIG. 8 illustrates in more detail how the transmit power $P_{t_{R\_SCH}}^m$ for the reverse supplemental channel is calculated. FIG. 8 corresponds to step 716 of FIG. 7. The calculation of the transmit power $P_{t_{R\_SCH}}^m$ for the reverse supplemental channel begins at step 800. At step 802, the CDMA planner computes the average transmit power and the full rate transmit power for the reverse supplemental channel. The full rate transmit power is computed according to Equation 12 below:

$$P^{FULL}_{tR-SCH} = \frac{R\_SCH\_EIRP^m_n(k, im(ibin, f_i))_n}{L^m_f(im(ibin, f_i))_n \cdot G^m(k, \theta_{point}(im(ibin, f_i))_n} \quad (Eq. 12)$$

The average transmit power is computed according to Eq. 13 below:

$$P^{AVE}_{tR-SCH} = \frac{R\_SCH\_EIRP^m_n(k, im(ibin, f_i))_n}{L^m_f(im(ibin, f_i))_n \cdot G^m(k, \theta_{point}(im(ibin, f_i))_n} \cdot \gamma_{R-SCH} \quad (Eq. 13)$$

At step 804, the CDMA planner determines whether the full-rate transmit power computed in step 802 is below or equal to the minimum subscriber unit transmit power. If so, the CDMA planner sets the transmit power equal to the minimum subscriber unit transmit power at step 806, and the procedure ends at step 814. If the full-rate transmit power computed in step 802 is above the minimum power level for the subscriber unit, the CDMA planner then determines at step 808 whether the full-rate transmit power computed in step 802 exceeds the maximum power level for the subscriber unit multiplied by the effective fade margin, $FM_{eff}$. If so, the transmit power $P_{t_{R\_SCH}}^m$ for the reverse supplemental channel is set equal to zero at step 810, and the procedure ends at step 814. If the full-rate transmit power computed at step 802 is above the minimum power level for the supplemental channel and below the maximum subscriber power multiplied by the effective fade margin, the CDMA planner sets in step 812 the transmit power equal to the average transmit value computed in step 802 as shown in Eq. 13, and then the procedure ends.

Figure 9:
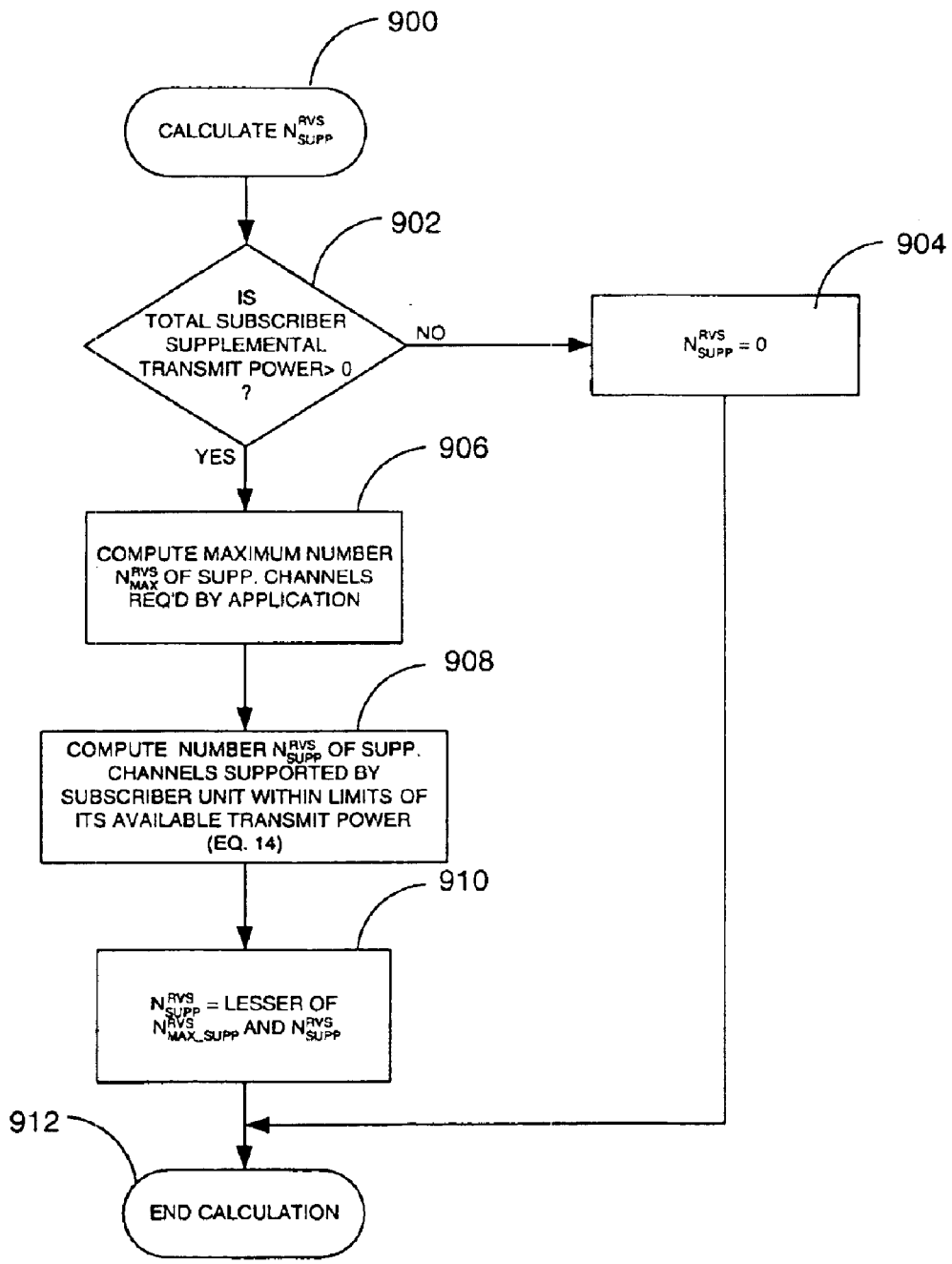
FIG. 9 is a flow diagram of the calculation of the number of supplemental channels required by a subscriber unit.

FIG. 9 illustrates how the number $N_{Supp}^{rvs}$ of reverse supplemental channels supported by a subscriber unit is calculated. This value is used in the fallback procedure shown in FIG. 10. This value is also used to calculate the total transmit power for all supplemental channels in step 320 of the call admission procedures shown in FIG. 3. The calculation of $N_{Supp}^{rvs}$ begins at step 900. At step 902, the CDMA planner determines whether the total power allocated to reverse supplemental channels is greater than zero. If the total power allocated to reverse supplemental channels is not greater than zero, $N_{Supp}^{rvs}$ is set equal to zero at step 904 and the procedure ends at step 912.

If the reverse supplemental power is greater than zero, the CDMA planner determines the maximum number $N_{max\_Supp}^{rvs}$ of reverse supplemental channels required by the application associated with the subscriber unit at step 906. This number is determined by reference to a look-up table as previously described. At step 908, the CDMA planner computes a trial value for $N_{Supp}^{rvs}$ that can be supported by the subscriber unit within the limits of its available transmit power. Equation 14 below shows how the trial value for $N_{Supp}^{rvs}$ is calculated.

$$\frac{MobileMaxPwr(i_m(ibin, f_i))_n \times FM_{eff}(im(ibin, f_i))_n}{[P_{t_{R-SCH}}^m(k, im(ibin, f_i))]_n}$$

$$\frac{\lfloor P_{R-PICH}^m(BestFundServSec(im(ibin, f_i))_n, im(ibin, f_i))\rfloor_n}{[P_{t_{R-SCH}}^m(BestFundServSec(im(ibin, f_i))_n, im(ibin, f_i))]_n} -$$

$$\frac{[P_{t_{R-FCH}}^m(BestFundServSec(im(ibin, f_i))_n, im(ibin, f_i))]_n}{[P_{t_{R-SCH}}^m(BestFundServSec(im(ibin, f_i))_n, im(ibin, f_i))]_n}$$

(Eq. 14)

At 910, the CDMA planner compares the trial value of $N_{Supp}^{rvs}$ to $N_{max\_Supp}^{rvs}$ and sets the final value of $N_{Supp}^{rvs}$ to the lesser of those two values. Processing then turns to the calling procedure (step 912).

FIG. 10 illustrates the fallback procedure employed by the call admission procedure shown in FIG. 3. The fallback procedure is called at step 314 of FIG. 3. Once the fallback procedure begins (step 1000), the CDMA planner computes the number of reverse supplemental channels supported by the subscriber unit at step 1010. The calculation of this value is shown in FIG. 9. At step 1012, the CDMA planner compares $N_{Supp}^{rvs}$ to $N_{max\_Supp}^{rvs}$. If $N_{Supp}^{rvs}$ is less than $N_{max\_Supp}^{rvs}$, the desired peak data rate is lowered to an optimum supportable data rate in steps 1014 and 1018. In particular, the CDMA planner computes a fall-back data rate at step 1014 using the look-up function previously described and then re-computes at step 1018 the number of supplemental channels required at the reduced data rate. Assuming that the data rates allowed by the corresponding technology standard are organized in sequence in the look-up table as shown, the look-up function selects the next lower data rate and extracts the corresponding number of channels from the look-up table at step 1018.

At step 1022, the fallback procedure determines whether the number of supplemental channels computed at step 1018 is greater than zero. If so, the fallback procedure moves back to step 1012 to verify that the reduced data rate is within the limits of the subscriber unit's transmit power. This process continues until the data rate is reduced to a level that can be supported by the subscriber unit, or until the number of supplemental channels is reduced to zero. When one of those two conditions is met, the analysis returns to step 316 of the call admission procedure shown in FIG. 3 (step 1020).

If the number of supplemental channels supported by the subscriber unit is greater than the number of channels required by the application at step 1012, the fall-back procedure then determines whether the required transmit power at the requested peak data rate is greater than the available power at step 1016. If so, the fallback procedure reduces the requested data rate at step 1014 and re-computes the number of supplemental channels at step 1018 as previously described. If, at step 1016, the required transmit power at the requested peak data rate is less than the available power, the fallback procedure terminates and the analysis continues at step 316 of FIG. 3 (step 1024).

Forward link analysis follows the reverse link analysis outlined above at step 112. As earlier noted, the CDMA planner generates a random set of users for each analysis. This set of subscribers is analyzed to determine which ones of the randomly populated subscribers are able to close reverse communication links with one or more sectors (radio base stations). Forward link analysis further refines the subscriber set by determining a subset of subscribers with reverse link service are also able to obtain forward link service, as well as computing total forward link power for each forward link traffic channel type, and identifying the best sector for two-way radio service for each subscriber in the subset of subscribers having both forward and reverse link service.

Once the CDMA planner determines this subset of subscribers, it randomizes the subscriber subset (e.g., sorts the subset of subscribers) for the purposes of call admission processing. In call admission processing, the CDMA planner simulates the call admission process across the service area in the different sectors using a random subscriber admission order. Call admission adopts forward blocking procedures based on a number of blocking parameters relating to Walsh code limitations, power limitations, and other factors.

In particular, the CDMA planner adopts a novel approach to resource reservation to insure that a definable percentage of system resources are reserved in each sector in the simulated service area for voice users (voice type subscribers) in the simulation population. This approach avoids the possibility of one or more high rate data subscribers consuming all available communication resources in any one sector or sectors. This same approach keeps those data users located at the edge of a sell from consuming all the sector power.

In particular, the CDMA planner insures that some percentage of the total available forward link power in one or more sectors represented in the simulation is reserved for voice users. Power reservation insures that some amount of the available forward transmit power is held in reserve for use by only voice type users. The percentages of power reserved for voice and data users may be defined per sector or on a system-wide basis before beginning the analysis. The CDMA planner may permit rules to be associated with power reservation. For example, the user may be able to assign priorities, such that a voice-type subscriber can take power otherwise reserved for a data-type subscriber while disallowing data users to steal from reserved voice power.

Power reservation, and resource reservation in general, may represent a necessary or at least advisable approach for system operators fielding mixed voice and data networks. Without such reservation schemes, high data rate users may, in practice, overuse a wireless communication system such that, at least in localized areas (e.g., a given service sector), the available communication resources are consumed by a relative few users. Allowing this type of data-oriented utilization to dominate the network is undesirable in that it may interfere with the likely substantial number of users whose chief concern is reliable, readily available voice service.

Forward link simulation as implemented in the CDMA planner adopts a resource reservation scheme to insure adequate system resources for a configurable number of voice users in each simulated sector. More particularly, the CDMA planner adopts a "bucketing" approach wherein the total forward power in each sector is split in a configurable percentage allocation between a "voice power bucket" and a "data power bucket." If desired, the CDMA planner may be configured to give voice users priority over data users in that it may be configured to allow voice users to steal power from the data bucket when needed. In most, if not all cases, it is expected that the reverse behavior will be disallowed. That is, data users are not allowed to steal power from the voice power bucket. Power bucketing, along with the overall forward link process are detailed in the discussion below.

Figure 11:
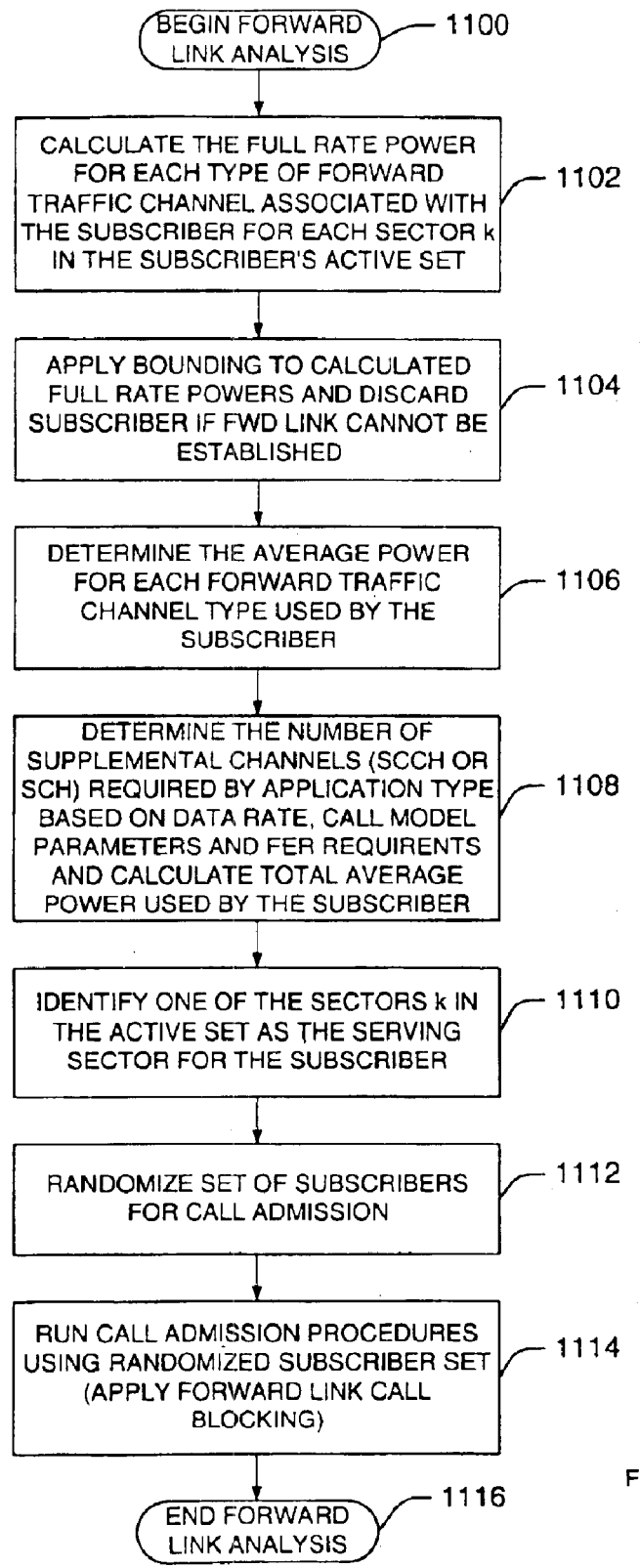
FIG. 11 is a flow diagram overview of forward link analysis.

FIG. 11 provides an overview of the forward link analysis performed in one analysis iteration or trial. A set of iterations (those required to reach convergence) are defined inside one trial. The number of trials in an analysis is a user-defined value, including the step size. Iteration here refers to the overall set of analyses applied to a given set of subscribers in one simulation run or trial of the CDMA planner. Thus, during a given analysis trial, one or more of the forward and reverse link analyses may be iterated within the trial loop to, for example, reach convergence.

Forward link analysis begins (step 1100) with the CDMA planner determining the full rate power for each forward traffic channel type associated with each of the subscribers in the analysis set (step 1102). That is, for each of the subscribers capable of receiving reverse link service, the CDMA planner evaluates the power necessary to close a full rate forward link with each subscriber, for each of the forward traffic channel types associated with the subscriber, at each sector k in the subscriber's active set. For more than one frequency, the same process is executed independently on a per carrier basis. A given subscriber unit may have two sectors $k_1$ and $k_2$ in its active set, and may be associated with an application type requiring both fundamental channels and supplemental channels on the forward link. In this example, the CDMA planner determines the full rate power necessary to close the forward link from $k_1$ and $k_2$ for both types of forward link channels associated with the subscriber unit.

The active set is associated with the fundamental channel in RC3, RC4, and RC5, and with the fundamental code channel in RC1 and RC2. For supplemental channels in RC3, 4, and 5, or for supplemental code channels in RC1 and 2, a supplemental active set is computed.

The fundamental and supplemental channels could be configured to different FER requirements, which results in different required traffic Eb/Io (noise to interference) ratios. It is for this reason that a set of forward and reverse required Eb/Io values are defined. Additionally, the active set may be different between fundamental and supplemental channels.

Once full rate powers are determined for each channel type, the CDMA planner applies bounding (step 1104) to the calculated powers. Bounding insures that the calculated powers are achievable, and within operational limits. Thus, the calculated forward link channel powers are compared to lower and upper transmit power limits. If the required power on either fundamental or supplemental channel types exceeds the maximum achievable power at every sector k in the subscriber's active set, the subscriber is eliminated from the current analysis set. Power bounding is performed for all subscribers in the analysis set and thus results in an analysis set of subscribers capable of obtaining reverse and forward link service from at least one sector k.

Each subscriber unit is associated with a defined application type. Each application type includes activity factor information, which relates to channel utilization. The Forward Link activity factor is then corrected according to the number of power control bits punctured in the corresponding Radio Configuration. Activity factors are used to estimate the average power required for each channel type associated with each subscriber (step 1106). The above step insured that full rate power on the forward link could be achieved from at least one sector k in each subscriber's active set during the application session. However, running the actual simulation based on average forward link power is more realistic.

With the calculated average powers for each channel type associated with each subscriber in the analysis set, the CDMA planner determines the number of supplemental channels required for each subscriber based on the peak data rate required by the application (step 1108). Here supplemental channel generically refers to both supplemental code channels (SCCH) for subscriber units or sectors compatible with Radio Configurations 1 and 2 defined for IS-95 based access terminals, as well as to supplemental channels (SCH) for subscriber units in Radio Configurations 3, 4, or 5 defined for TIA/EIA IS-95B standard based access terminals, as well as to supplemental channels (SCH) for subscriber units and sectors compatible with Radio Configurations 3, 4, and 5 defined for cdma200-based (TIA/EIA IS-2000A standard) access terminals. With the number of supplemental channels determined, and the average power required per channel type, the CDMA planner calculates the total average power required to provide forward link traffic channel service to each subscriber, for each sector k independently per carrier frequency in each subscriber's active set.

For each subscriber, the CDMA planner identifies the sector k in the active set with the strongest signal strength as the "serving sector" for purposes of analysis (step 1110). Preferably, this involves identifying the sector k having the lowest reverse link transmit power for that subscriber unit, although other criteria may be used.

At this point, the CDMA planner randomizes the analysis set (step 1112) in advance of call admission procedures. Here, randomization refers to randomizing the call admission order of subscribers in the analysis set. This randomized set of subscribers is then used for call admission processing. During call admission, the randomly sorted subscribers are admitted, or request admission to the simulated network based on the above determined channel power and serving sector information.

Randomization may also apply to sector selection. First, a randomly sorted subscriber is admitted in one sector, then another subscriber is admitted in a different sector from a list of randomly sorted subscribers for that other sector, and so on. This admission procedure or criteria provides more accuracy in power (Pin and Pout) computations, and more realistic values for loading and frequency reuse computations, as might be performed by the CDMA planner.

Call admission procedures (step 1114) simulate the performance of the planned wireless network with regard to admitting and serving the currently defined set of subscribers, with their respective random geographic locations and service needs (application types and application requirements). A number of forward blocking criteria are used during call admission, including blocking based on Walsh code availability, and sector power availability. Upon completion of call admission processing, forward link analysis ends for the current iteration (step 1116).

Figure 12:
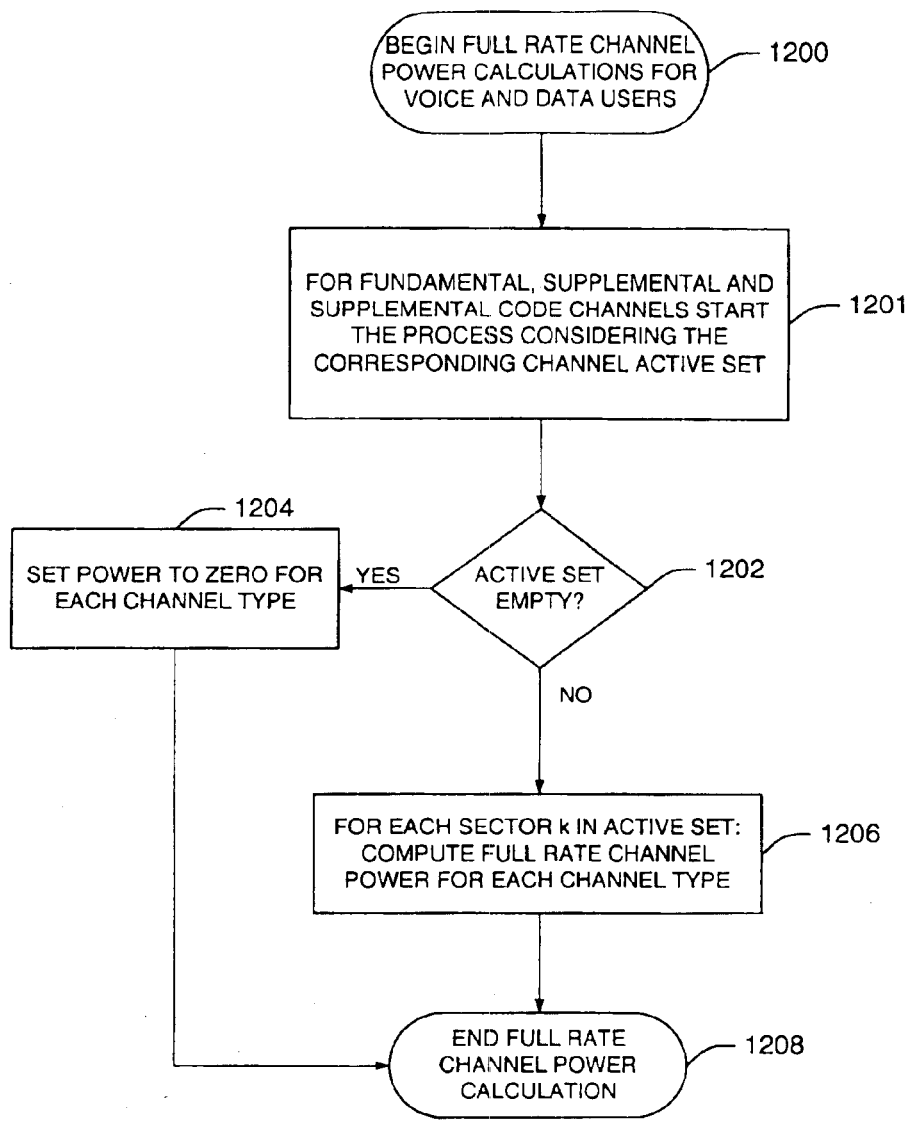
FIG. 12 is a flow diagram of full rate forward link traffic channel power calculations.

The balance of forward link flow diagrams provides supporting details for the above overview. FIG. 12 illustrates the full rate forward channel power calculations performed at step 1102 in FIG. 11. As noted, full rate power calculations are performed for each subscriber in the analysis set, and for each type of forward link traffic channel associated with or assigned to each subscriber (subscriber unit), as defined by the subscriber's application type.

Processing begins (step 1200) in consideration of all channel types in the corresponding the active channel set (step 1201) with the CDMA planner determining whether the current subscriber's active set is empty (i.e., no sectors from which service is available). If the active set is empty (step 1202), the power for all channel types associated with the current subscriber is set to zero (step 1204), and processing for that subscriber ends (step 1208).

If the active set is not empty, the CDMA planner calculates the full rate power for each forward link traffic channel type from each sector k in the subscriber's active set (step 1206), and processing ends for the current subscriber (step 1208). Note that channel power calculations are performed for each subscriber randomly generated and assigned to the analysis set.

In the CDMA planner, the individual traffic channel powers are preferably computed based on full rate transmission. The full data rate required for transmission identified by the mapping from the bin and frequency assignment of the subscriber type $im(ibin,f_i)$ is denoted as $R_{set\_fwd}(im(ibin, f_i))$.

The Peak Data Rate required for transmission identified by the mapping from the bin and frequency assignment of the subscriber type $im(ibin,f_i)$ is denoted as $\hat{R}_{b\_Fwd}(im(ibin, fi))$.

Data rates defined or used in the IS-2000A standard are given by radio configuration in the table below:

| Radio Configuration [number] | $R_{set\_fwd}(im(ibin, f_i))$ [kbps] |
|---|---|
| RC1 | 9.6 |
| RC2 | 14.4 |
| RC3 | 9.6 |
| RC4 | 9.6 |
| RC5 | 14.4 |

Because of power bucketing where a certain amount of forward link power is reserved for voice users, as will be explained later, subscriber application types are broadly categorized as voice type or data type. This allows the CDMA planner to identify voice and data users in its power calculations and in its forward link call admissions process, which is described later.

The variable $[App^m(im(ibin,fi))_{data}{}^{voice}]$ is termed an "Application Identifier," which is a parameter with two possible values, "0" or "1". These values are set for each subscriber in advance of simulation based the kind of application linked to each subscriber unit. As such, the parameter represent a flag identifying the associated application as a voice application or a data application, and is generated by a subscriber type, located in an specific bin ibin and frequency assignment $f_i$. The mapping from the bin and frequency assignment to a subscriber type associated to a voice or data application is given by $im(ibin,f_i)$.

By definition of $[App^m(im(ibin,fi))_{data}{}^{voice}]$ we have, $$[App^m(im(ibin, f_i))_{data}^{voice}] = \begin{cases} 0 & \text{IF } im(ibin, f_i) \text{ is doing Voice Applications} \\ 1 & \text{IF } im(ibin, f_i) \text{ is doing Data Applications} \end{cases} \quad \text{(Eq. 15)}$$

In general, the CDMA planner computes full rate forward link traffic channel for each channel type associated with each subscriber, at each subscriber's assigned frequency $f_i$. The following power variables are generally defined for forward link calculations and are computed for each subscriber:

$[Fund\_P_{tch}{}^c(k,im(ibin,f_i))]_n{}^{voice}$ representing the Fundamental Channel Full Rate Forward Link Traffic Channel Power required by a subscriber type identified with a voice application, located in a specific bin ibin and frequency assignment $f_i$ in order to close the link with the $k_{th}$ sector in the system;

$[Fund\_P_{tch}{}^c(k,im(ibin,f_i))]_n{}^{data}$ representing the Fundamental Channel Full Rate Forward Link Traffic Channel Power required by a subscriber type identified with a data application, located in a specific bin ibin and frequency assignment $f_i$ in order to close the link with the $k_{th}$ sector in the system;

$[SCCH\_P_{tch}{}^c(k,im(ibin,f_i))]_n{}^{voice}$ representing the Supplemental Code Channel Full Rate Forward Link Traffic Channel Power required by a subscriber type identified with a voice application, located in a specific bin ibin and frequency assignment $f_i$ in order to close the link with the $k_{th}$ sector in the system, for radio configurations RC1 or RC2;

$[SCCH\_P_{tch}{}^c(k,im(ibin,f_i))]_n{}^{data}$ representing the Supplemental Code Channel Full Rate Forward Link Traffic Channel Power required by a subscriber type identified with a data application, located in a specific bin ibin and frequency assignment $f_i$ in order to close the link with the $k_{th}$ sector in the system, for radio configurations RC1 or RC2;

$[SCH\_P_{tch}{}^c(k,im(ibin,f_i))]_n{}^{voice}$ representing the Supplemental Channel Full Rate Forward Link Traffic Channel Power required by a subscriber type identified with a voice application, located in a specific bin ibin and frequency assignment $f_i$ in order to close the link with the $k_{th}$ sector in the system, for radio configurations RC3, RC4 or RC5; and $[SCH\_P_{tch}{}^c(k,im(ibin,f_i))]_n{}^{data}$ representing the Supplemental Channel Full Rate Forward Link Traffic Channel Power required by a subscriber type identified with a data application, located in a specific bin ibin and frequency assignment $f_i$ in order to close the link with the $k_{th}$ sector in the system, for radio configurations RC3, RC4 or RC5.

The full rate forward fundamental channel power calculation for voice users is given as as, $$[Fund\_P_{tch}^c(k, im(ibin, f_i))]_n^{voice} = \frac{R_{set\_fwd}(im(ibin, f_i))}{W} \times \frac{P_{PICH}^c(k, f_i)}{\sum_{\hat{k} \in \{Fund\_ProcessSet(im(ibin, f_i))\}_n} \left[\left(\frac{E_c}{I_o}\right)_{F-PICH}(\hat{k}, im(ibin, f_i))\right]_n} \times \left(\frac{E_b}{I_o}\right)_{Fund\_tch\_req}^m (im(ibin, f_i)) \quad \text{(Eq. 16)}$$

The full data rate required for transmission identified by the mapping from the bin and frequency assignment of the subscriber type im(ibin,$f_i$) is represented by $R_{set\_fwd}$(im (ibin,$f_i$)), while w corresponds to the system transmission bandwidth and it is expressed in Hertz, the variable $P_{PICH}^c$(k,ix,iy,$f_i$) corresponds to the forward pilot channel power at the sector k, and the term $$\left[\left(\frac{E_c}{I_o}\right)_{F-PICH}(\hat{k}, im(ibin, f_i))\right]_n$$

represents the Pilot Chip Energy to Total Interference also called the "Pilot Strength." In this case, this last term is identified by the mapping from the bin and frequency assignment of the subscriber type im(ibin,$f_i$) and associated to the elements of the Fundamental Process Set during the same iteration, denoted as $\{Fund\_ProcessSet(im(ibin,f_i))\}_n$.

Finally, the factor $$\left(\frac{E_b}{I_o}\right)^m_{Fund\_tch\_req}(im(ibin, f_i))$$

is the Required Bit Energy to Total Interference Ratio in the Fundamental Channel associated to the mobile unit perfectly identified by im(ibin,$f_i$) in the frequency assignment $f_i$. This last term is discussed in more detail later herein.

The above expression for full rate fundamental channel voice power may be generalized for application to supplemental channels (SCCH and SCH) and fundamental channels for data users. Of course, certain variables, such as the data rates, Process Set for Fundamental and Supplemental channels, and the required bit-energy-to-total-interference values, are set to the values appropriate for the specific channel type for which power is being calculated.

Figure 13:
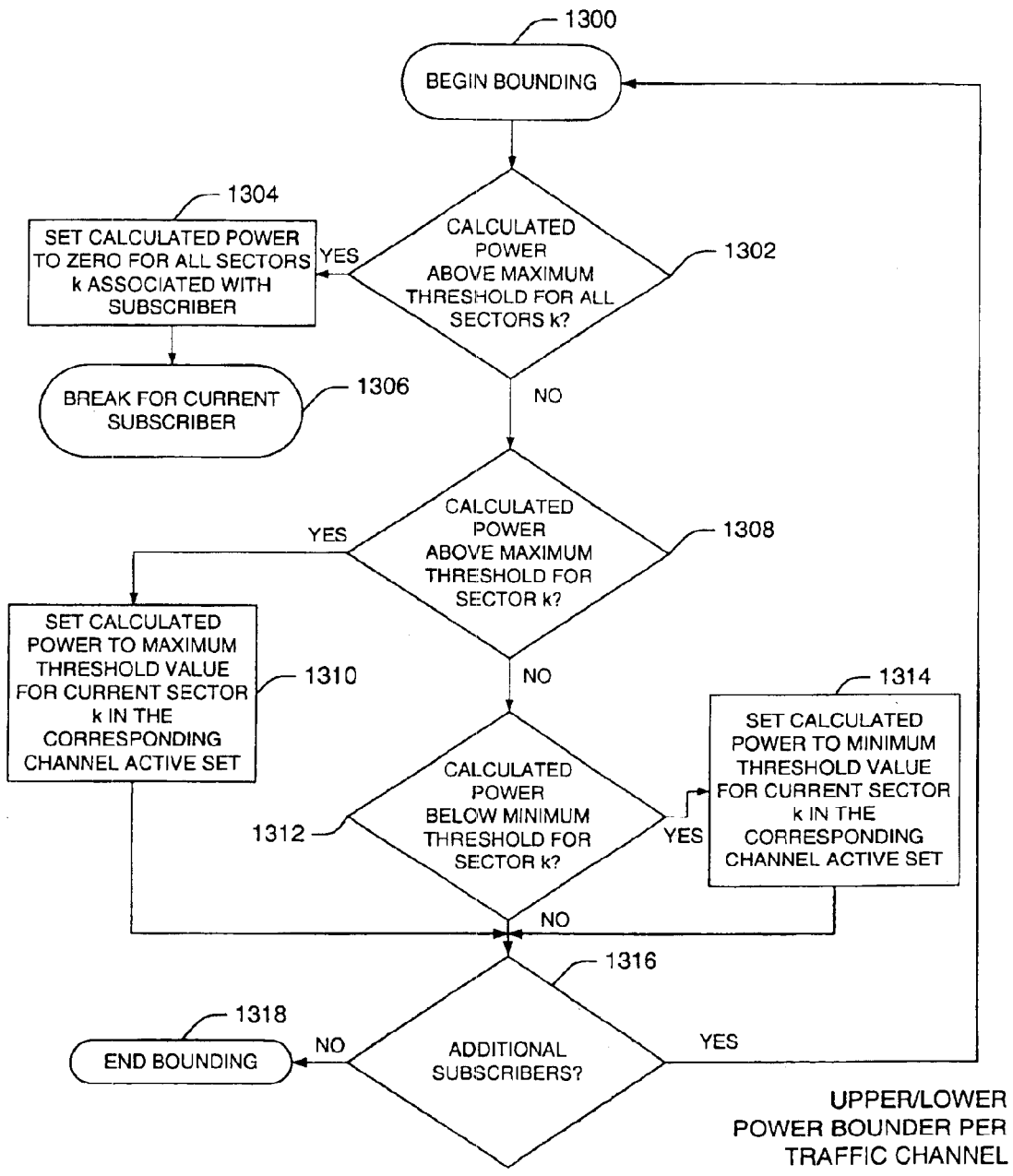
FIG. 13 is a flow diagram of power bounding applied to the results of forward link traffic power calculations.

Power bounding is performed after full rate power calculations, and this is illustrated in detail in FIG. 13. Bounding is performed for the full rate powers calculated for each subscriber, at each sector k in the subscriber's active set. Processing begins (step 1300) with the CDMA planner determining whether the full rate fundamental or supplemental forward traffic channel power calculated for the current subscriber exceeds the maximum forward transmit power for that channel type at all sectors in the active set and supplemental active set, respectively (step 1302). If so, this indicates that no sector can close the forward link on one or both types of forward traffic channels, so the calculated power for all associated channel types is set to zero subscriber's active set (step 1304). After breaking for the current subscriber (step 1306), processing continues from step 1300 for the next subscriber.

If the calculated power for the forward link traffic channel types associated with the current subscriber is above the maximum threshold for the current sector (step 1308), the calculated power is bounded or reduced to the maximum threshold value (step 1310), and processing continues with a determination of whether any sectors remain in the current subscriber's active set (or supplemental active set for supplemental channels) (step 1316). If so, the same bounding evaluations are applied to the next sector k in the active set (or supplemental active set for supplemental channels), and so on until all sectors in the set are evaluated. If the calculated power (for any associated channel type) is below the minimum transmit power for the current sector (step 1312), the power for that channel type is adjusted upwards to the minimum power (step 1314). Once the last sector for the current subscriber is analyzed, processing ends for the current subscriber (step 1318), and is repeated for each of the remaining subscribers.

As an example of lower bounding applied to the calculated Fundamental Channel Full Rate Forward Traffic Channel Power required by a subscriber type identified with a voice application and denoted as $[Fund\_P_{tch}^c(k,im(ibin, f_i))]_n^{voice}$ for the iteration number n can be given generically as, $$P_{tch\_lower}(k, f_i) = \gamma_f(k, f_i) * G_a^2 * G_{PICH}^2(k, f_i) \times 10^{\left(\frac{PTX_{lower}(k,f_i)}{10}\right)} \quad \text{(Eq. 17)}$$

Where $\gamma_f(k,f_i)$ represents the forward power activity (weighting) factor associated with the sector k in the frequency assignment $f_i$. This value represents the Forward Link activity factor corrected based on the number of power control bits punctured per frame in the corresponding radio configuration. $G_a^2$ represents an analog gain factor used to convert the digital gain (coding gain) into effective power. This is calculated as, $$G_a^2 = \frac{P_{F-PICH}^c(k, f_i)}{G_{PICH}^2(k, f_i)} \quad \text{(Eq. 18)}$$

with $P_{F-PICH}^c(k,f_i)$ as the forward pilot channel power at the sector k. The term $G_{PICH}^2(k, f_i)$ corresponds to the digital gain for the forward pilot channel.

$PTX_{lower}(k,f_i)$ is the lower limit on active forward traffic channel. This parameter shows the lower limit for full rate (peak rate) traffic channel gain. In the equation, we have $G_{tch}=G_{PICH}\times 10^{L/20}$, where the parameters is usually given in ranges and dB units.

While the above equation illustrates the basic approach, a different $PTX_{lower}(k,f_i)$ parameter is maintained per type of channel. Thus, for the fundamental channel power adjustment illustrated, the CDMA planner uses $PTX_{lower}^{F-FCH}(k, f_i)$. Note also that the computation of the forward traffic channel power will be carried out using the corresponding forward power activity (weighting) factor associated with the sector k in the frequency assignment $f_i$ as part of the final computation for total forward traffic channel power at each sector. By adjusting the weighting factors, lower power limits, and full rate power terms in the above generic equation, the weighted or adjusted power may be determined for each channel type for each subscriber, at each associated sector.

The upper bounding of forward traffic power may be illustrated for the fundamental channel for each user. This process applies system limits to the forward traffic channel powers calculated for each subscriber.

The generic calculation for a forward traffic channel power with a upper bound applied is listed below:

$$P_{tch\_upper}(k, f_i) = \gamma_f(k, f_i) * G_a^2 * G_{PICH}^2(k, f_i) \times 10^{\left(\frac{PTX_{upper}(k,f_i)}{10}\right)} \quad \text{(Eq. 19)}$$

Where $\gamma_f(k,f_i)$, $G_a^2$ and $G_{PICH}^2(k,f_i)$ has been already defined and explained in the discussion lower power bounding above.

$PTX_{upper}(k,f_i)$ is the upper limit on active forward traffic channel. This parameter represents the upper limit for full rate (peak rate) traffic channel gain. In the equation, we have $G_{tch}=G_{PICH}\times 10^{L/20}$, where, again, the parameters is usually given in ranges and dB units.

The approach is based on the generic equation shown earlier, however we maintain a different, upper bounding $PTX_{upper}(k,f_i)$ parameter per type of channel, radio configuration, data rate, mobile channel type (e.g., vehicular, pedestrian, fixed, etc.), use of fast power control, etc. For the example, the CDMA planner uses the parameter $PTX_{upper}^{F-FCH}(k,f_i)$. At the end, the computation of forward traffic channel power will be completed considering the corresponding forward power activity (weighting) factor per channel associated to the sector k in the frequency assignment $f_i$.

Figure 14:
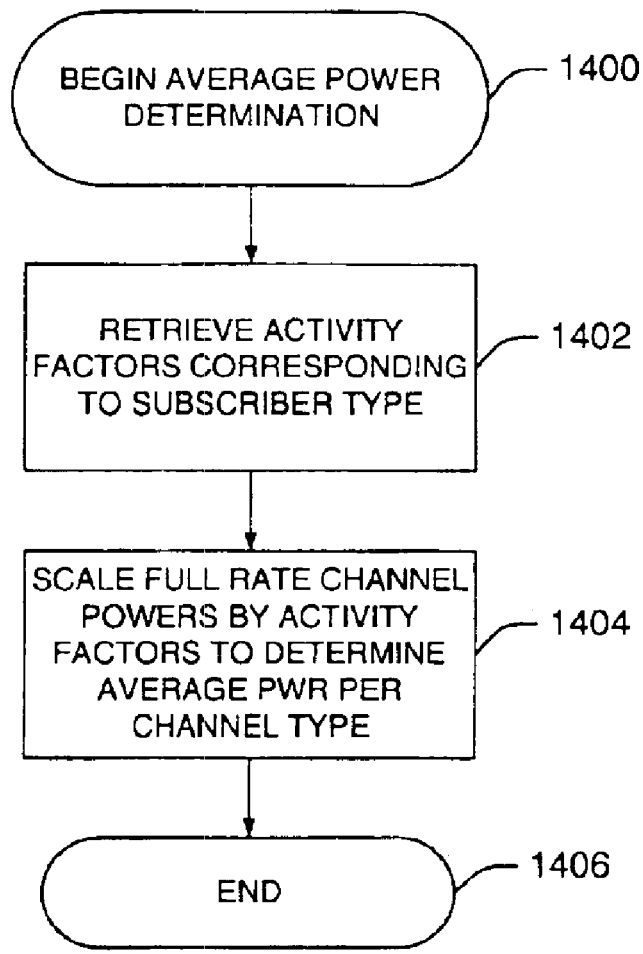
FIG. 14 is a flow diagram of average forward link traffic channel power calculations.

FIG. 14 details the average power calculations performed for each active set of sectors for each subscriber, and uses the weighting factors (also termed "activity factors") presented in the weighted power calculations immediately above.

For each subscriber, processing begins (step 1400) with the CDMA planner accessing a data table (e.g., a look-up table) based on subscriber application type (step 1402). Based on the user-defined parameters associated with the application call model, the look-up table defines activity factors that relate to channel utilization, which may be used by the CDMA planner to determine the average power for each type of forward link traffic associated with the subscriber (step 1404). Preferably, the activity factor is expressed as a percentage use per link (Forward or Reverse) per channel (Fundamental Channel, Supplemental Code Channel, or Supplemental Channel) value or the like, such that the full rate power may simply be multiplied or scaled by the activity factor to determine average power. Once average power is determined for each channel type, processing ends for the current subscriber (step 1406). The above steps are then repeated for the remaining subscribers.

Figure 15:
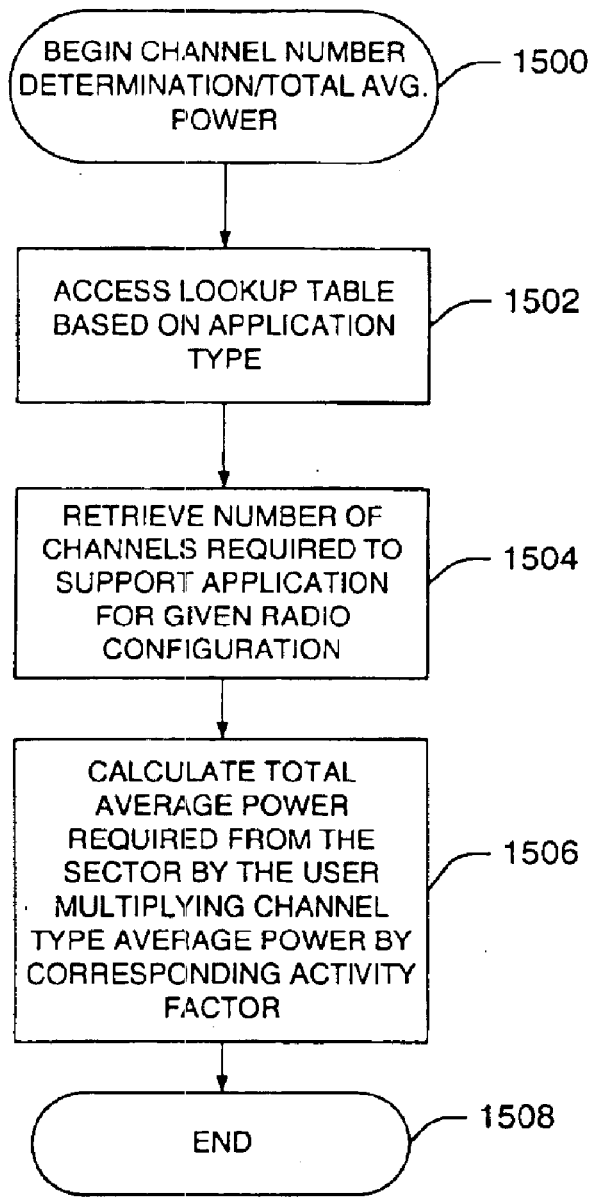
FIG. 15 is a flow diagram of total average powers for the calculations of FIG. 14.

With the average channel power per channel type for each subscriber at each associated sector determined above, the CDMA planner determines the total average power required at each sector k in each subscriber's active set and supplemental active set. FIG. 15 details these operations. Processing begins (step 1500) with the CDMA planner accessing a look-up table or other data structure that maps application type to the required number of channels (step 1502). That is, the CDMA planner uses the look up table information to determine how many supplemental channels (SCCH or SCH) are nominally required by each subscriber's application type at the specified data rate. The subscriber's radio configuration determines whether the supplemental channels involved are SCCH or SCH type channels in the reverse link. The sector's radio configuration determines whether the supplemental channels involved are SCCH or SCH type channels in the forward link. Table 1 shown earlier illustrates an exemplary structure for this information.

The CDMA planner retrieves the needed information for the current application (step 1504), and calculates the total average power by multiplying the average power calculated for each forward link channel type (fundamental, supplemental, or supplemental code channel) at each sector in the associated channel active set by the activity factor associated with the specific channel (step 1506). This procedure is applied because each supplemental channel could have different target frame error rate or operation data rates and different activity factors. Processing for the current subscriber then ends (step 1508) and is repeated for the remaining subscribers.

In general, with the activity factors (computed by link at the specified data rate and frame error rate) and the average power calculated for each forward link channel type, the CDMA planner can calculate the total forward link traffic channel power at a given sector for a given subscriber unit. The number of channels corresponding to the application type is used to compute the number of required terms in the sum-product used in the computation explained above.

If the system has enough resources in order to provide to a subscriber the level of service that it requests during call admission processing, the Forward Transmitted Traffic Channel Power is given by the relation listed below:

For radio configurations 1 and 2 ($RC_s|_{s=1,2}$) a subscriber's total average forward link power is given as:

$$[P_{tch}^c(k, ibin, f_i)]_n^{voice} = [\hat{\gamma}_{fwd\_ch}^{voice}(im(ibin, f_i))]_n^{F-FCH} \times \quad \text{(Eq. 20)}$$
$$[Fund\_P_{tch}^c(k, ibin, f_i)]_n^{voice} +$$
$$[\hat{\gamma}_{fwd\_ch}^{voice}(im(ibin, f_i))]_n^{F-SCCH} \times$$
$$[SCCH\_P_{tch}^c(k, ibin, f_i)]_n^{voice}.$$

While for data, we have:

$$[P_{tch}^c(k, ibin, f_i)]_n^{data} = [\hat{\gamma}_{fwd\_ch}^{data}(im(ibin, f_i))]_n^{F-FCH} \times \quad \text{(Eq. 21)}$$
$$[Fund\_P_{tch}^c(k, ibin, f_i)]_n^{data} +$$
$$[\hat{\gamma}_{fwd\_ch}^{data}(im(ibin, f_i))]_n^{F-SCCH} \times$$
$$[SCCH\_P_{tch}^c(k, ibin, f_i)]_n^{data}.$$

With the power bucketing of the present invention, which is discussed elsewhere herein, the CDMA planner computes the full rate forward power for fundamental and supplemental (code) channels independently based on the type of application (both voice and data). The application identifier flag for each user, namely the $[App^m(im(ibin,fi))]_{data}^{voice}$ value, is used to identify subscribers as voice or data. As noted, this preferably "1" or "0" parameter exists for a subscriber type, located in an specific bin ibin and frequency assignment $f_i$, where the mapping from the bin and frequency assignment to a subscriber type associated with a voice or data application is im(ibin,$f_i$).

The total forward transmitted traffic channel power at a given sector should be computed as a sum of the total average power of each subscriber active for that sector. The activity factors used to average the per subscriber full rate powers may come from a look-up table, and may be defined for voice and data by channel type per link at the specified data rate and channel frame error rate.

Thus, exemplary expressions are as follows:

$$[\hat{\gamma}_{fwd\_ch}(im(ibin, f_i))]_n^{F-FCH} = \quad \text{(Eq. 22)}$$
$$\begin{cases} [\hat{\gamma}_{fwd\_ch}^{voice}(im(ibin, f_i))]_n^{F-FCH} \text{ for voice applications} \\ \quad\quad\quad\quad \text{Or} \\ [\hat{\gamma}_{fwd\_ch}^{data}(im(ibin, f_i))]_n^{F-FCH} \text{ for data applications} \end{cases}$$

and $$[\hat{\gamma}_{fwd\_ch}(im(ibin, f_i))]_n^{F-SCCH} = \quad \text{(Eq. 23)}$$
$$\begin{cases} [\hat{\gamma}_{fwd\_ch}^{voice}(im(ibin, f_i))]_n^{F-SCCH} \text{ for voice applications} \\ \quad\quad\quad\quad \text{Or} \\ [\hat{\gamma}_{fwd\_ch}^{data}(im(ibin, f_i))]_n^{F-SCCH} \text{ for data applications} \end{cases}$$

Again, if the system has enough resources in order to provide to a subscriber the level of service that it requests, the Forward Transmitted Traffic Channel Power for radio configurations RC3, 4, and 5 for voice is given by the relation listed below:

$$[P^c_{tch}(k, ibin, f_i)]_n^{voice} = [\hat{\gamma}^{voice}_{fwd\_ch}(im(ibin, f_i))]_n^{F-FCH} \times \quad \text{(Eq. 24)}$$
$$[\text{Fund\_P}^c_{tch}(k, ibin, f_i)]_n^{voice} +$$
$$[\hat{\gamma}^{voice}_{fwd\_ch}(im(ibin, f_i))]_n^{F-SCH} \times$$
$$[\text{SCH\_P}^c_{tch}(k, ibin, f_i)]_n^{voice}$$

For data, the corresponding expression is:

$$[P^c_{tch}(k, ibin, f_i)]_n^{data} = [\hat{\gamma}^{data}_{fwd\_ch}(im(ibin, f_i))]_n^{F-FCH} \times \quad \text{(Eq. 25)}$$
$$[\text{Fund\_P}^c_{tch}(k, ibin, f_i)]_n^{data} +$$
$$[\hat{\gamma}^{data}_{fwd\_ch}(im(ibin, f_i))]_n^{F-SCH} \times$$
$$[\text{SCH\_P}^c_{tch}(k, ibin, f_i)]_n^{data}$$

The corresponding activity factors are given as:

$$[\hat{\gamma}_{fwd\_ch}(im(ibin, f_i))]_n^{F-FCH} = \quad \text{(Eq. 26)}$$
$$\begin{cases} [\hat{\gamma}^{voice}_{fwd\_ch}(im(ibin, f_i))]_n^{F-FCH} & \text{for voice applications} \\ \quad\quad\quad\quad\quad \text{Or} \\ [\hat{\gamma}^{data}_{fwd\_ch}(im(ibin, f_i))]_n^{F-FCH} & \text{for data applications} \end{cases}$$

and as, $$[\hat{\gamma}_{fwd\_ch}(im(ibin, f_i))]_n^{F-SCH} = \quad \text{(Eq. 27)}$$
$$\begin{cases} [\hat{\gamma}^{voice}_{fwd\_ch}(im(ibin, f_i))]_n^{F-SCH} & \text{for voice applications} \\ \quad\quad\quad\quad\quad \text{Or} \\ [\hat{\gamma}^{data}_{fwd\_ch}(im(ibin, f_i))]_n^{F-SCH} & \text{for data applications} \end{cases}$$

Figure 16:
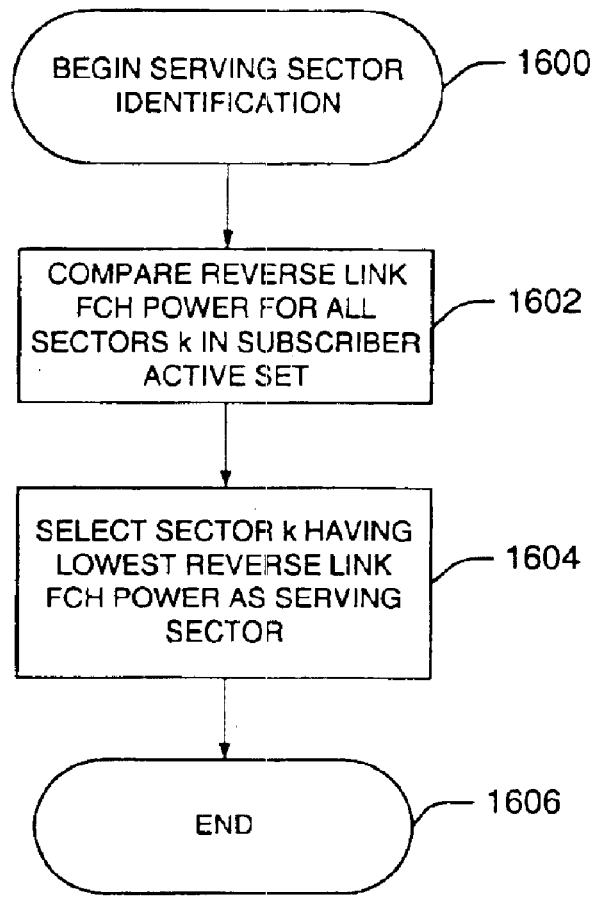
FIG. 16 is a flow diagram of identifying subscribers' serving sectors.

FIG. 16 details the serving sector function implemented by the CDMA planner for each subscriber in the analysis set. Processing begins (step 1600) with the CDMA planner reviewing the reverse link power from the current subscriber with respect to each sector in the subscriber's active set (step 1602). From these, the CDMA planner selects the sector where reverse link power from the subscriber unit is the lowest (step 1604). The identified sector is denoted as the serving sector for the subscriber for purposes of call admission processing. Processing then ends for the current subscriber (step 1606). These processing steps are repeated for each subscriber, such that each subscriber in the analysis set has an identified serving sector.

Figure 17:
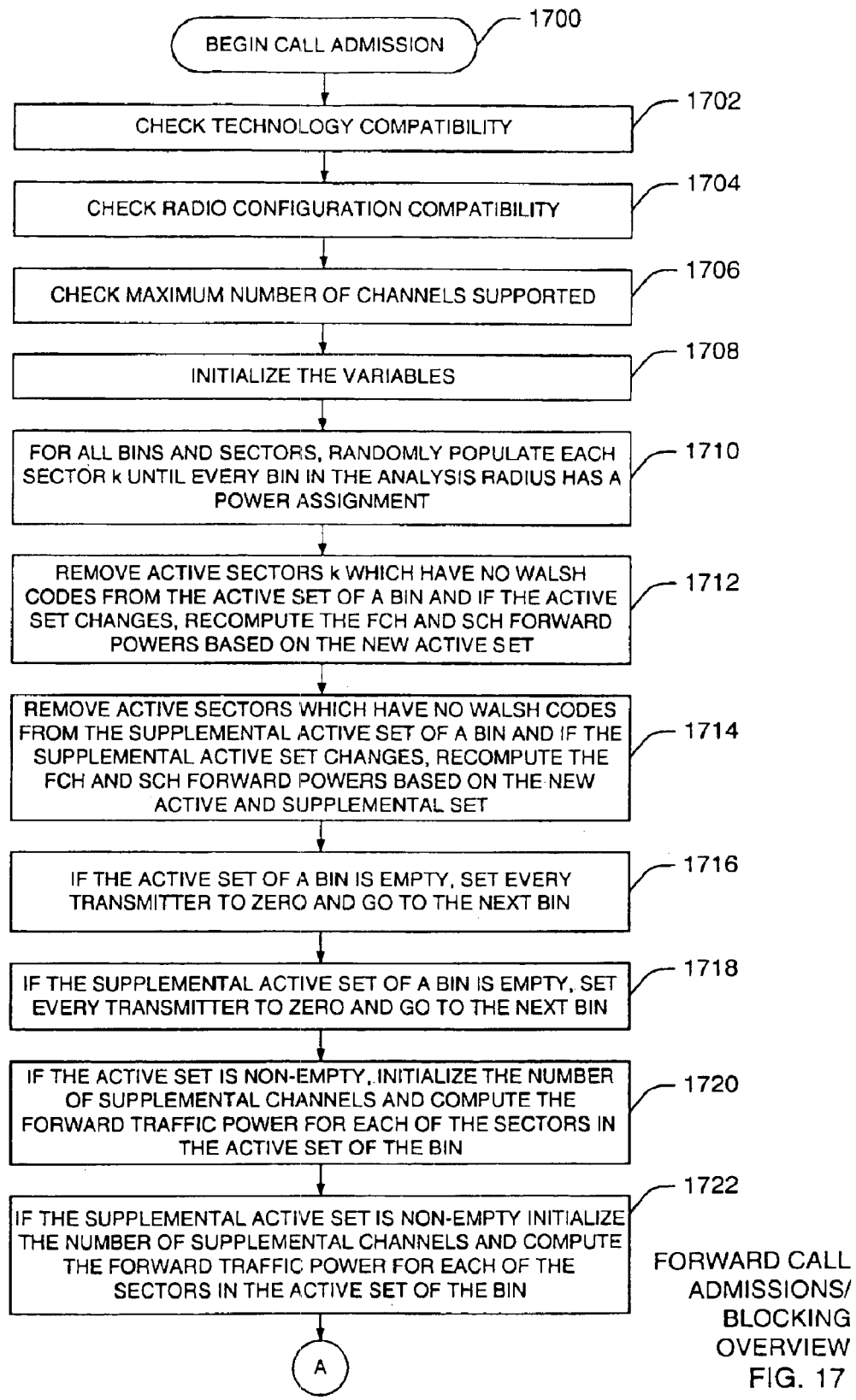
FIG. 17 is a flow diagram of forward call admissions/blocking overview steps.

Once the above power and serving sector determinations are made for each subscriber, call admission processing begins. This complicated process involves a number of exemplary steps that are outlined in FIG. 17, although these steps may be substantially varied.

Processing begins (step 1700) with the CDMA planner checking the technology compatibility of the defined subscriber types regarding the technology specified per sector basis or system wide (step 1702), along with checks of compatibility of the radio configurations defined for the subscriber units (step 1704). Again, the CDMA planner checks the Radio Configuration compatibility between subscriber units and sectors within the system. The criteria for checking compatibility follow rules specified in the TIA/EIA IS-2000A standard between base stations and subscriber units. Next, the CDMA planner determines if the maximum number of supplemental channels defined by the application types associated with the subscribers exceeds a maximum allowed number of supplemental channels. This evaluation is typically made with regard to the radio configuration defined for each subscriber (step 1706). Processing continues with the CDMA planner initializing many of the variables and counters used in call admission, such as the running totals of power and Walsh code counts at each sector involved in the analysis (step 1708).

Then, for all bins (and all the subscribers randomly generated inside each bin) and all associated sectors, the CDMA planner randomly populates each sector k until every subscriber in the analysis radius has a power assignment (step 1710). Active sectors that have no available Walsh codes are removed from each subscriber's active set. For each subscriber's whose active set is changed by this operation, re-compute new forward traffic channel powers, for both fundamental and supplemental channel power (steps 1712 and 1714).

If the active set of any subscriber is empty, the transmit power is set to zero for that subscriber, and the next subscriber is evaluated (step 1716). In an exemplary implementation, a supplemental active set is defined for each subscriber, wherein the supplemental active set is a subset of the active set and indicates with which sectors the subscriber can close supplemental channel links. If the supplemental active set for a given subscriber is empty, associated transmitter power for that subscriber is set to zero (step 1718).

Then, for each subscriber with non-empty active (and/or supplemental) sets, the subscriber's forward and supplemental channels are initialized and the forward traffic channel power for each sector associated with the subscriber is computed (step 1720 and 1722).

Figure 18A:
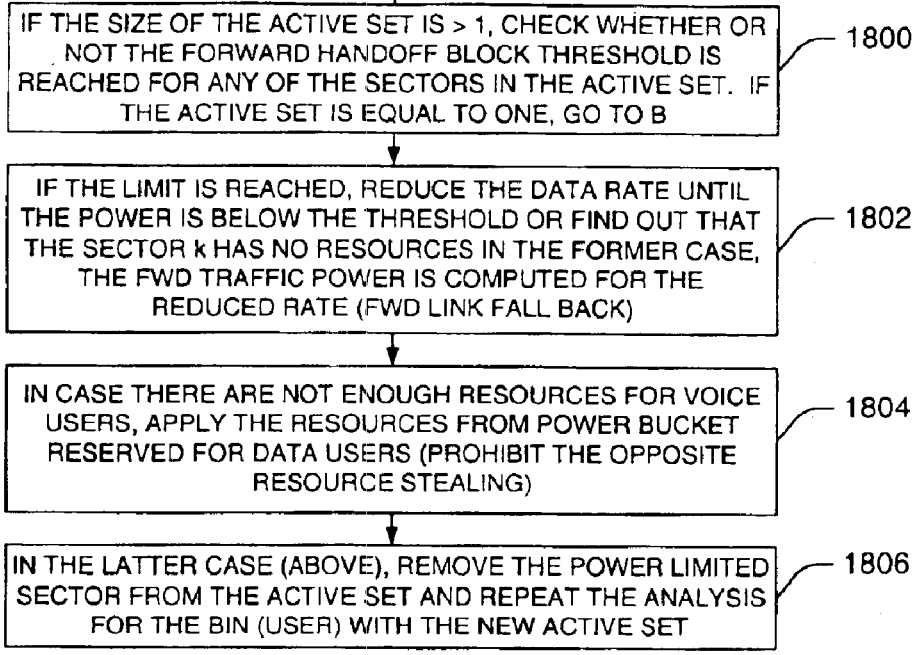
FIGS. 18A and 18B are continuations of the flow of FIG. 17.

Processing continues in FIG. 18A, where the CDMA planner checks the size of each subscriber's active set (step 1800). Essentially, if there is more than one sector in a subscriber's active set, that subscriber is in a soft handoff condition, or capable of soft handoff, wherein the subscriber unit communicates simultaneously with two or more sectors. If the active set size is not greater than one, processing proceeds at Point B, as outlined in FIG. 18B.

Otherwise, processing continues with the CDMA planner determining whether the forward power limit has been reached for a given sector in the subscriber's active set. If so, the CDMA planner implements a fall-back admission scheme, wherein that subscriber's data rate is reduced for all sectors in the active set if the application type permits fall back (step 1802). Before the analysis, the planner user specifies the fall-back data rate set available for each defined application within the simulated system. The data rates steps for each application are compatible with the defined or permissible data rates per radio configuration indicated in the TIA/EIA IS-2000A standard. The lowest data rate in the set corresponds to the minimum in operational data rate for a corresponding application. There is no fall-back iteration possible if this minimum data rate is reached.

As noted earlier, the CDMA planner implements resource reservation, such that some resources at each sector are reserved for voice type users. In an exemplary implementation, the CDMA planner sets aside a percentage of total forward transmit power at each sector for voice users, and may set aside another or remaining percentage of forward power for data users. Reserved power is figuratively held in voice and data power buckets, with power being incrementally taken from the appropriate bucket as subscribers are admitted to the different sectors during call admission processing.

If a voice type subscriber cannot be admitted to a given sector because of a limitation in remaining voice bucket power, the CDMA planner attempts to allocate the needed power from that remaining in the data bucket (step 1804). If the sector simply does not have enough reserve power in either bucket to admit the subscriber, it is considered a power limited sector and removed from the subscriber's active set (step 1806). In that case, the subscriber analysis is repeated with the new active set. Before beginning the analysis, the planner user should select any desired subscriber type prioritization rules. Thus, the planner user may specify a rule that voice users have admission priority over data users during the simulation, or may specify that data users have priority. Power bucketing, wherein one or more portions of total sector power are designated for supporting specific subscriber types may also be configured. Thus, the CDMA planner may permit the planner user to specify whether power bucketing is enabled or disabled, and whether voice and data user power reservation is based on independent power buckets, if that feature is enabled.

Figure 18B:
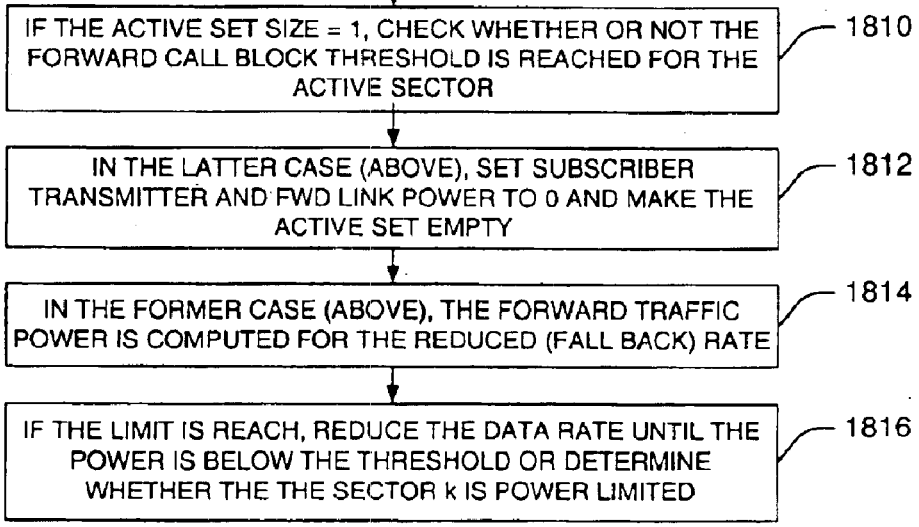

For subscribers not in hand-off, the processing in FIG. 18B applies. The CDMA planner checks for each subscriber at the corresponding active sector whether the forward call block threshold has been reached (step 1810). If so, the CDMA planner sets the associated subscriber transmitter and forward link powers to zero (step 1812). If the forward call block threshold has not been reached for the active sector, the CDMA planner reduces the subscriber's data rate (falls back), and re-computes the associated power necessary to support the subscriber at the reduced data rate (step 1814). The data rate is reduced until the required power is below the power limit of the sector, or until the CDMA planner determines that the available power is inadequate to admit the subscriber at the lowest allowed fallback data rate (step 1816). In that case, the sector is considered to be a power-limited sector with respect to that subscriber and is removed from the subscriber's active set.

Figure 19:
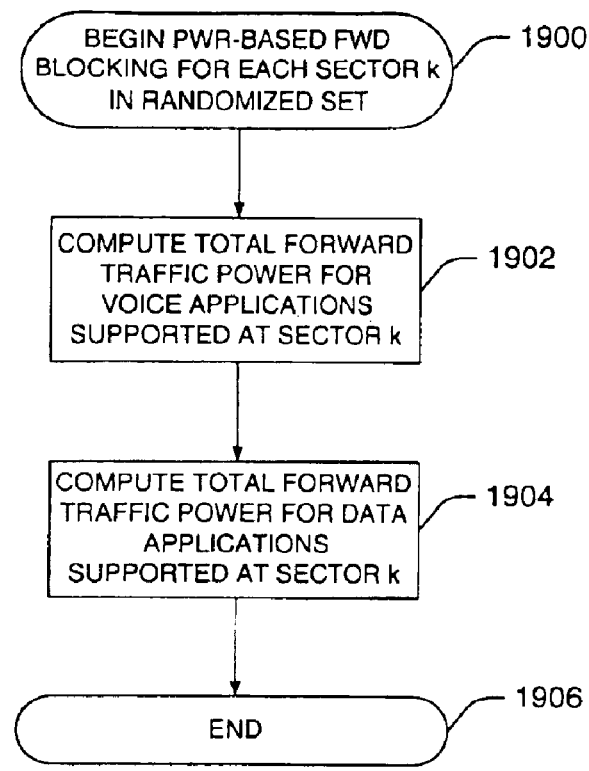
FIG. 19 is a flow diagram of total voice and data power calculations per sector.

FIG. 19 provides more details regarding the initial steps taken in forward blocking during subscriber admissions. Processing begins (step 1900) with the CDMA planner computing the total forward traffic power for voice and data users (subscribers) at each sector k (steps 1902 and 1904). Of course, this depends upon the active set defined for each subscriber associated with each channel, which defines the particular sectors associated with a given subscriber. Once these powers are calculated, this portion of processing ends (step 1906).

Figure 20:
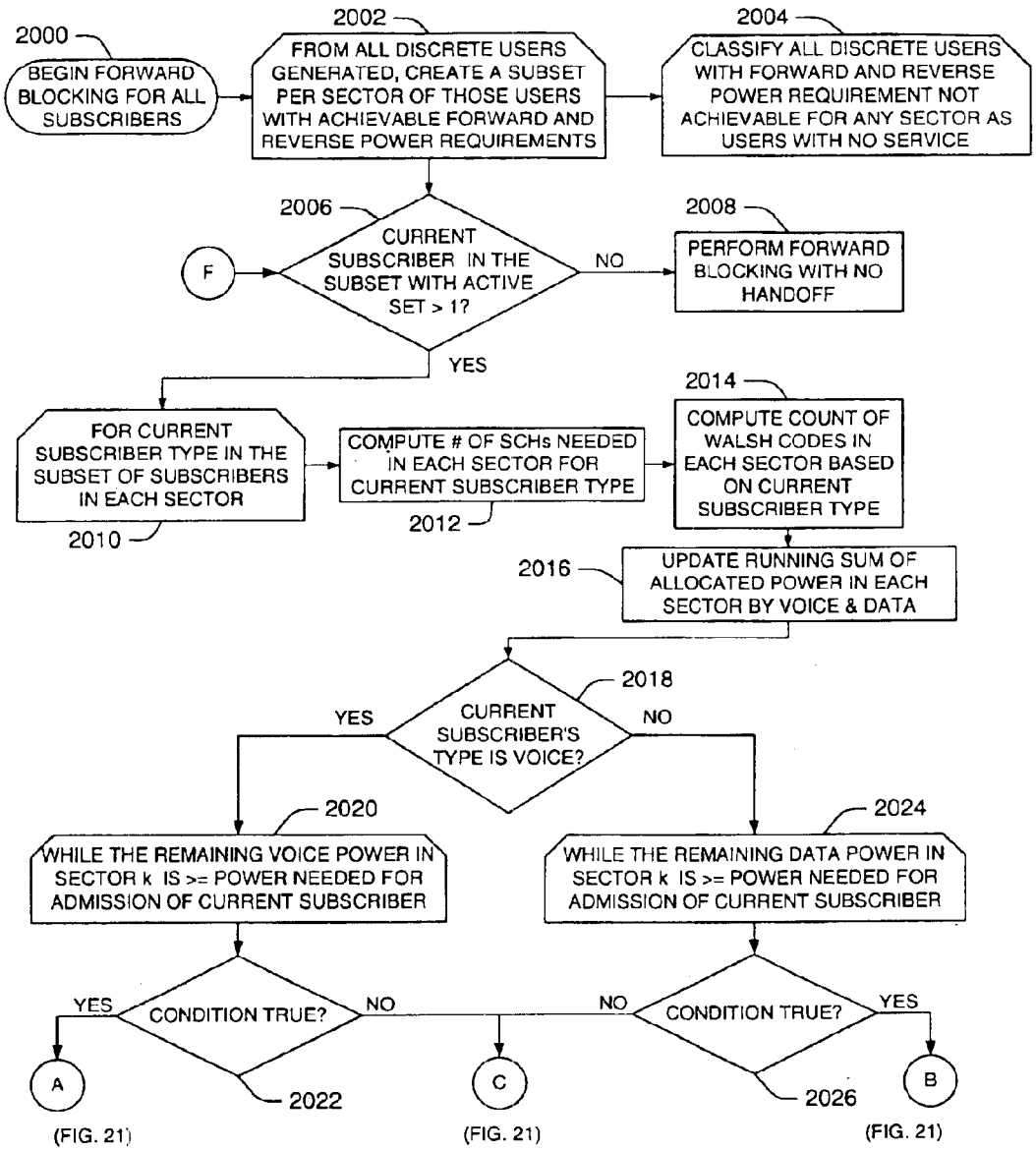
FIG. 20 is a flow diagram of forward call blocking with handoff.

FIG. 20 presents a detailed exemplary forward call blocking method that is applied to each subscriber in the simulation trial. However, a general understanding of call admissions using forward blocking is helpful. The CDMA planner generates a random set of subscribers having random application types based on demand specifications and user-defined subscriber distribution, thus the planner may run simulations with voice users, data users, or with a mix of voice and data users. The data users simulated by the CDMA planner further vary in terms of the particular data application (call model, frame error rate requirements, activity factor per link, etc.) and associated data rate requirements.

From this set of subscribers, the CDMA planner determines which ones can achieve service in one or more of the sectors in the simulated service area. Generally, this is done by analyzing forward and reverse link powers between sectors and subscribers as greatly detailed above. For each subscriber that can receive service, a serving sector is identified. This serving sector will be the sector to which the subscriber is admitted, or evaluated for admission, during the call admission process.

In call admission, the CDMA planner preferably generates a random sort of all subscribers that can achieve service. It then submits these subscribers one at a time for admission (i.e., active communication service) to the simulated communications network based on the random sorting. Since each sector is power limited, whether a subscriber is admitted to a given sector depends upon the number and type of subscribers already admitted to that sector, and on the power and Walsh codes available at that point in the sector. Thus, by generating different sets of subscribers with different random admission orders, the CDMA planner simulates a variety of call admission scenarios, and generates output data useful in determining how often users in a real world system modeled on the simulated system can or cannot receive service, and at what data rate such service may typically be achieved at.

In general call admissions for admitting subscribers uses two blocking thresholds; one applies to subscribers in handoff, with the other applying to subscribers not in handoff. FIG. 20 illustrates this split. The forward link handoff-blocking threshold is a percentage of total forward link power at each sector or base station, which may be expressed in watts. The TotalFwdCap(k, $f_i$) term represents the total forward link power initially available at a sector k and may be calculated for each active frequency $f_i$ in at the sector, $$TotalFwdCap(k, f_i) = \qquad\qquad\text{(Eq. 28)}$$
$$\min\left\{MaxPA\_power(k, f_i), P^c_{PICH}(k, f_i) \times 10^{-\left(\frac{E_c}{I_{or}}\right)^{(k,f_i)}_{PICH\_limit}}\right\}$$

In the previous equation, MaxPA_power(k,$f_i$) represents the Maximum PA Power in sector k and frequency $f_i$. It is measured in Watts.

The variable $$\left(\frac{E_c}{I_{or}}\right)_{PICH\_limit}(k, f_i)$$

represents the Minimum Required $$\left(\frac{E_c}{I_{or}}\right)_{PICH}(k, f_i)$$

at sector k and frequency $f_i$. This parameter has dB units. Finally, $P_{PICH}^c(k,f_i)$ is the Forward Pilot Channel Power at sector k and frequency $f_i$.

Preferably, the Forward Link Call Blocking Threshold (FwdCallBlockTH(k,$f_i$)) and Forward Link Handoff Blocking Threshold (FwdHOBlock(k,$f_i$)) are given as a percentage of the Total Forward Power Available for Forward Service (TotalFwdCap(k,$f_i$)) at each given sector.

Thus, the forward call blocking thresholds (i.e., handoff and no handoff) may be set for each sector as a percentage of the total forward capacity at the sector. FwdCallBlockTH (k,$f_i$) and FwdHOBlock(k,$f_i$) may be used to represent the forward call blocking and forward call blocking with handoff thresholds, respectively. In general, the following relationship should be observed: FwdCallBlockTH(k,$f_i$) ≧FwdHOBlock(k,$f_i$).

As noted, FIG. 20 applies to active sets >1, so the handoff blocking threshold FwdHOBlock(k,$f_i$) applies. Processing begins (step 2000) with the CDMA planner determining the subset of subscribers that can obtain service from the sector providing coverage to the user, and a remaining subset of generated subscribers that cannot obtain service from the system (steps 2002 and 2004). Preferably, this assessment is based on whether an individual subscriber can close forward and reverse communication links with at least one sector in the simulated service area.

The CDMA planner then performs call admission based on attempting to admit individual subscribers to their respective serving sectors, with such admissions preferably performed in a random admission sequence through a random sequence of sectors. If the current subscriber (i.e., the next subscriber being admitted), is in a handoff condition (step 2006), processing continues for handoff threshold blocking, otherwise, processing shifts to non-handoff threshold blocking (step 2008), which is detailed at FIG. 24.

Hand-off threshold call admission, which is also referred to as forward blocking, continues based on the subscriber type (step 2010). The CDMA planner computes the number of supplemental channels required by each subscriber type associated with a current sector (step 2012) at the current application data rate, and further computes the Walsh code count based on subscriber types (step 2014) to check for Walsh code availability in the corresponding sector. The running sum of voice and data powers already allocated from the sector is made current (step 2016) in advance of determining whether there is enough remaining power for caller admission for the current subscriber. The CDMA planner determines whether a current subscriber is a voice or data type subscriber (step 2018), and branches appropriately.

If the subscriber type is voice, the CDMA planner determines whether the remaining voice power at the sector is sufficient to admit the subscriber (step 2020). If so (step 2022), processing continues to Point A, which is detailed in FIG. 21. If there is not sufficient remaining voice power (i.e., insufficient voice bucket power) to admit the current subscriber to the current sector, processing continues to Point C, which is detailed in FIG. 21.

If the subscriber type is data, the CDMA planner determines whether the remaining data power at the sector is sufficient to admit the subscriber (step 2024). If so (step 2026), processing continues to Point B, which is detailed in FIG. 21. If there is not sufficient remaining voice power (i.e., insufficient data bucket power) to admit the current subscriber to the current sector, processing continues to Point C, which is detailed in FIG. 21.

Note that the forward link power needed to provided service to a voice type subscriber may be expressed as, $$[P^c_{tch}(k, ibin, f_i)]^{voice}_n = \qquad \text{(Eq. 29)}$$
$$[\hat{\gamma}^{voice}_{fwd\_ch}(im(ibin, f_i))]^{F-FCH}_n \times [\text{Fund\_}P^c_{tch}(k, ibin, f_i)]^{voice}_n +$$
$$[\hat{\gamma}^{voice}_{fwd\_ch}(im(ibin, f_i))]^{F-SCH}_n \times [\text{SCH\_}P^c_{tch}(k, ibin, f_i)]^{voice}_n.$$

The forward link power for a data type subscriber may be expressed as, $$[P^c_{tch}(k, ibin, f_i)]^{data}_n = \qquad \text{(Eq. 30)}$$
$$[\hat{\gamma}^{data}_{fwd\_ch}(im(ibin, f_i))]^{F-FCH}_n \times [\text{Fund\_}P^c_{tch}(k, ibin, f_i)]^{data}_n +$$
$$[\hat{\gamma}^{data}_{fwd\_ch}(im(ibin, f_i))]^{F-SCH}_n \times [\text{SCH\_}P^c_{tch}(k, ibin, f_i)]^{data}_n.$$

The above expressions generate the total average power for voice or data subscribers based on applying an activity factor to the full rate powers.

Thus, for any given sector k, there is an initial amount of forward link power available for serving some number of subscribers. The actual number of subscribers that may be served depends upon a number of variables, including the forward link power required by each subscriber admitted for service at that sector. This power depends on application type, requested grade of service, propagation path characteristics, and other factors, which may all vary per individual subscriber and location.

Figure 21:
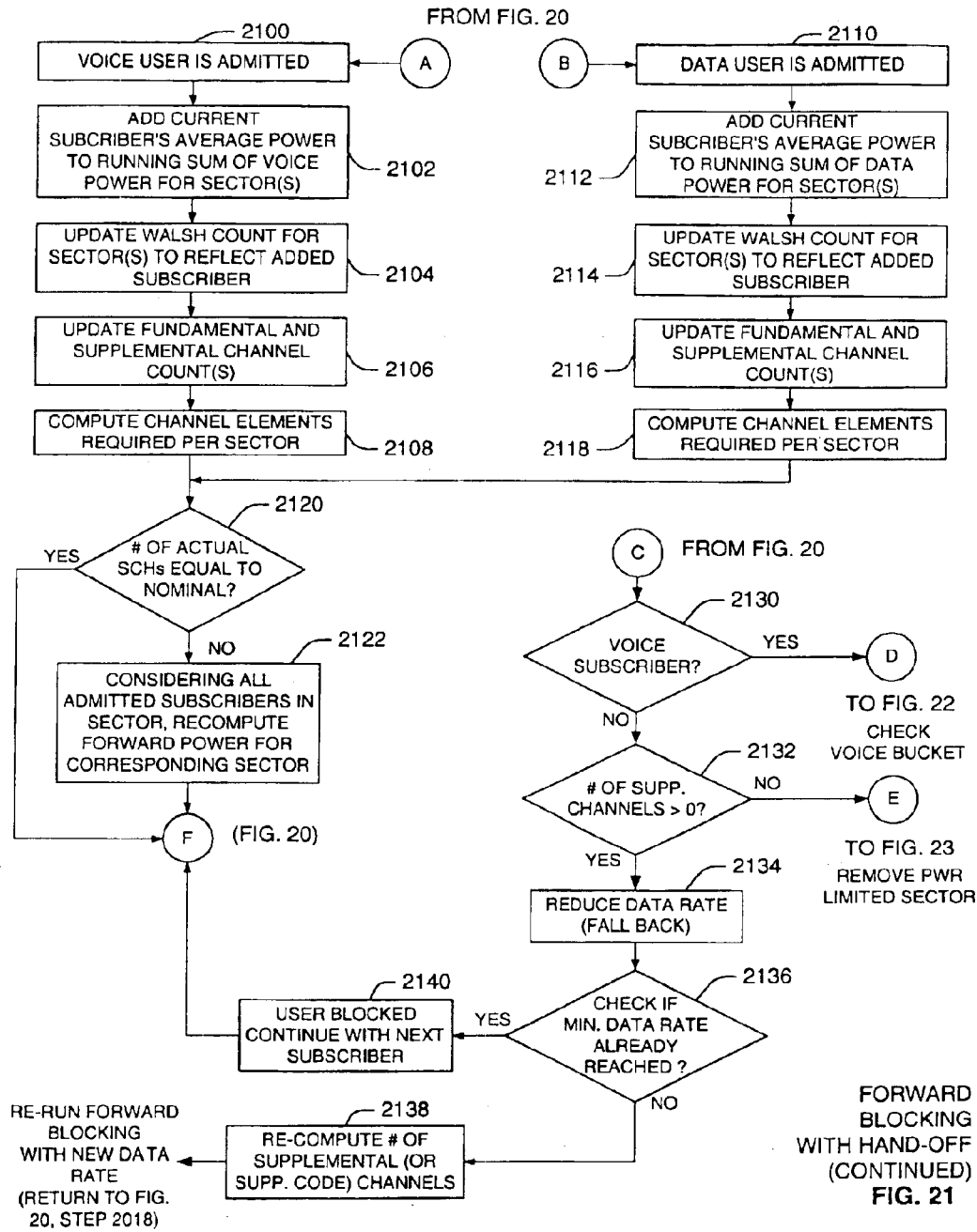
FIG. 21 is a continuation of FIG. 20.

In FIG. 21, voice user admission for the current subscriber begins at Point A. The current subscriber is admitted for service at the sector (step 2100), and the subscriber's forward traffic channel powers (e.g., fundamental channel power) are added to the running sum of total allocated voice user power at the sector to which the subscriber is being admitted (step 2102). The associated Walsh code counts and allocated supplemental channel counts and elements for the sector are also updated (steps 2104, 2106, and 2108).

The call admission process for data users where there is adequate remaining data bucket power is similar to that of voice users, and begins at Point B of FIG. 21. The current subscriber is admitted to the sector as a data user (step 2110), and the forward traffic channel powers (e.g., fundamental and supplemental channel powers) are added to the running sum of total allocated data user power for the sector to which the subscriber is being admitted (step 2112). The associated Walsh code counts, allocated supplemental channel counts, and channel elements for the sector are also updated (steps 2114, 2116, and 2118).

After admitting the current subscriber as either a voice or data user, processing continues (step 2120) with the CDMA planner determining whether the number of supplemental channels actually allocated at the sector to which the current subscriber was just admitted is equal to the nominal number of supplemental channels for the application types associated with the admitted subscribers at that sector. If so, processing continues for the next subscriber at Point F in FIG. 20.

If not, the CDMA planner re-computes the forward power at the involved sector in consideration of all subscribers admitted to service for that sector (steps 2122). Processing then continues for the next subscriber at Point F in FIG. 20.

In both the voice and data cases above, adequate power remained for admitting the current subscriber. Point C of FIG. 21 illustrates how individual voice and data subscribers are handled when adequate power is not available for admission. Processing begins (step 2130) with a determination of whether the current subscriber is voice or data user. If voice, processing continues at Point D of FIG. 22, which is explained later.

If data, processing continues with the CDMA planner determining whether the subscriber has one or more supplemental channels assigned to it (step 2132). If not, there can be no fall back operation, which means that, with respect to the current subscriber, the sector is power limited and must be removed from the active set. These operations are detailed at Point E of FIG. 23.

If the current subscriber has one or more supplemental channels, the CDMA planner reduces the data rate for the subscriber (step 2134), and then checks to see that the reduced data rate is at or above the minimum permissible data rate defined for the application type associated with the subscriber (step 2136). If so, the CDMA planner re-computes the number of supplemental channels needed for the reduced data rate (step 2138), and processing continues by re-applying the logic of FIG. 20 from Point F for the same subscriber at the reduced data rate. If not, the current subscriber is blocked from admissions (step 2140), and processing continues at point F in FIG. 20 for the next subscriber. As noted earlier, a look-up table of relating data rates and number of supplemental channels may be defined for each subscriber unit radio configuration and application type. The data rate steps in that table preferably follow the data rate options per radio configurations specified in the TIA/EIA IS-2000A standard.

If the reduced data rate is greater than or equal to the minimum data rate allowed for the subscriber's particular application type (step 2136), the number of supplemental channels for the reduced data rate are computed (step 2138), and the subscriber is run through the call admissions process of FIG. 20 at the reduced data rate. This may entail, for example, resuming logical processing at step 2018 of FIG. 20.

If the reduced data rate is below the allowable limits for the current subscriber (step 2136), the subscriber is blocked from admission to the current sector (step 2140), and processing returns to Point F of FIG. 20 for call admissions for the next subscriber (step 2134).

Figure 22:
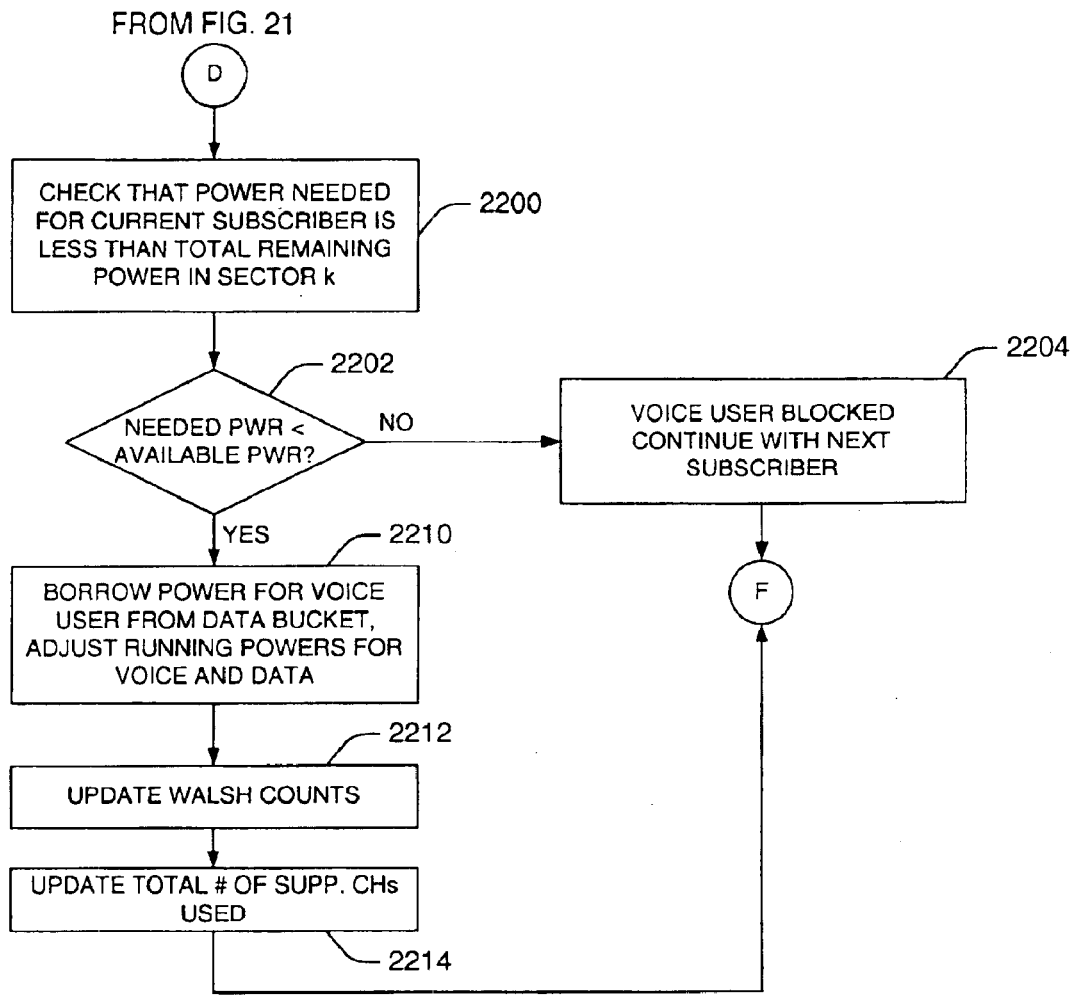
FIG. 22 is a flow diagram of power bucketing procedures for call admission with handoff.

FIG. 22 provides details for admitting a voice subscriber to a current sector when the remaining power in that sector's voice power bucket is insufficient to admit the current subscriber. From Point D, processing begins with the CDMA planner determining whether the power needed to admit the subscriber is less than the remaining total power available at the sector, which includes remaining power reserved for both voice and data users (step 2200). If the needed power is not less than the remaining total power (step 2202), the subscriber cannot be admitted to its serving sector, and is thus blocked from admission to that sector (step 2204), and processing continues for the next subscriber at Point F of FIG. 20.

If sufficient power remains, the CDMA planner borrows the needed power from the sector's data user power bucket (step 2210), and adjusts the running totals of voice and data user power for the sector appropriately. It then updates Walsh counts and supplemental channel counts to reflect admission of the new subscriber (steps 2212 and 2214), and processing ends (step 2216). Processing then continues for the next subscriber at Point F of FIG. 20. Based on the same bucket concept, other priority rules, for example, rules favoring data users, may be implemented in the CDMA planner.

Figure 23:
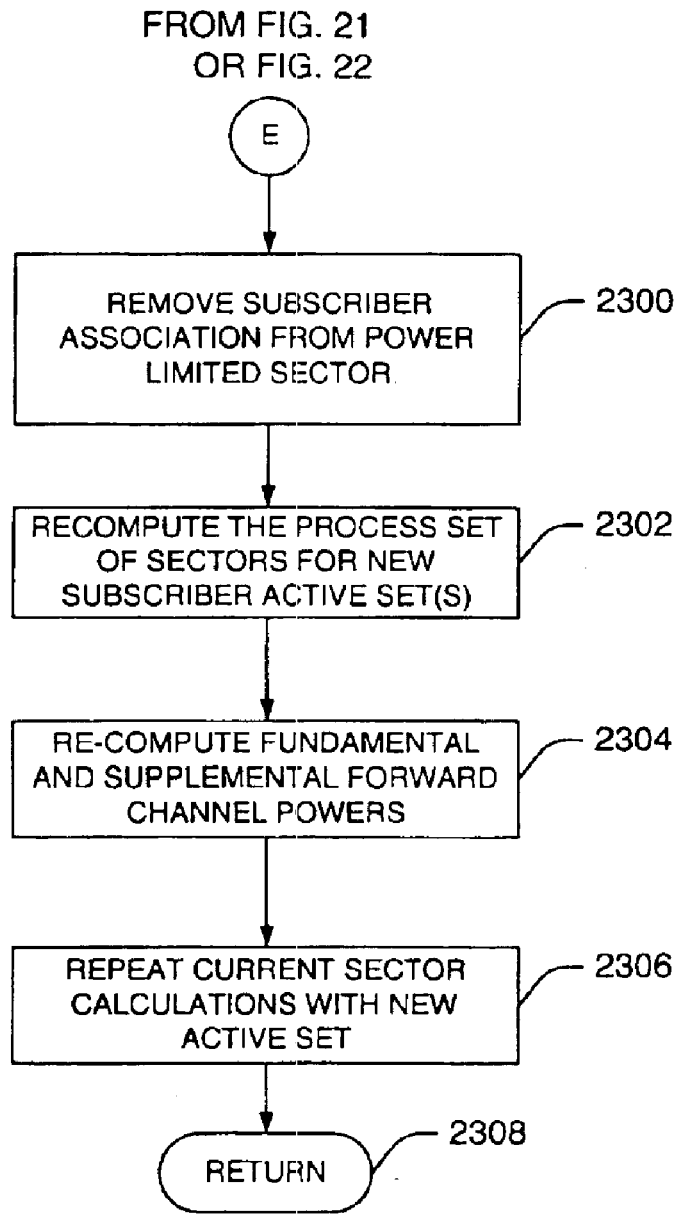
FIG. 23 is a flow diagram of power limited sector removal for call admission.

FIG. 23 provides details for processing taken from Point E, as identified in either of FIGS. 21 and 22. This processing applies where the sector is power limited with respect to the current subscriber. Processing begins with removal of the association between the subscriber and the sector (step 2300) for the current simulation trial of the CDMA planner. The power-limited sector is removed from the corresponding active set associated with the channel and the analysis is repeated for the bin with the new reduced channel active set.

Upon removal of the association, a new process set of sectors is computed in light of the adjustments just made to the subscriber active sets (step 2302). Fundamental and supplemental forward traffic channel powers are then recomputed (step 2304), the calculations for the current sector are repeated for the new active set (step 2306), and processing returns to the call admission procedures of FIG. 20 for the next randomly generated subscriber.

In the above operations, the new active set is generated by removing the pilot associated with the power-limited sector from the set corresponding to the channel. Anytime that forward traffic channel power is updated, the earlier indicated formula for full rate forward fundamental channel power is used, which is dependent on the new process set per channel and active set per channel. Upper and lower bounds are then applied to the new full rate forward traffic power, and then those values are weighted by the corresponding activity factors in order to obtain the new average forward traffic channel power values.

Figure 24:
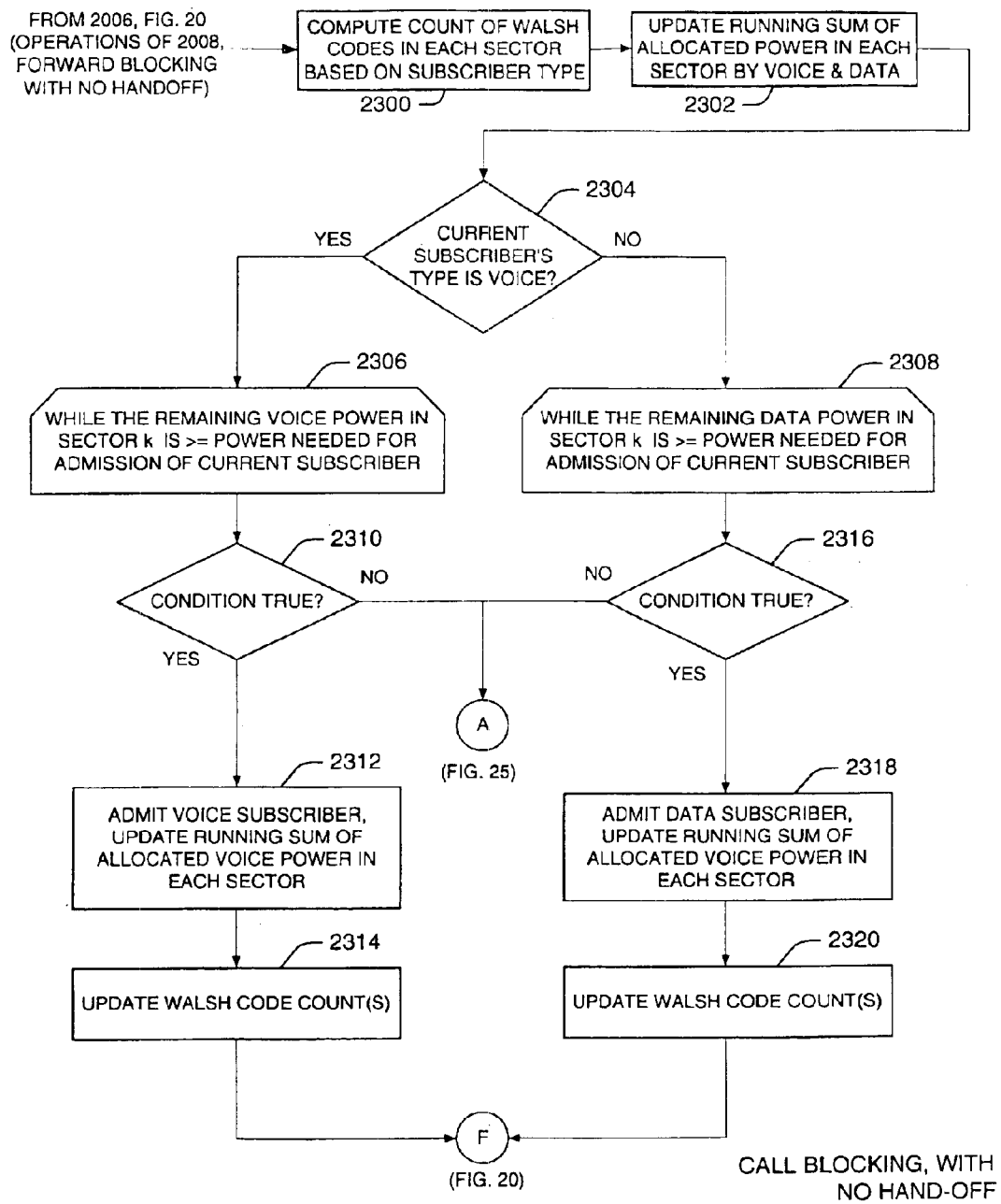
FIG. 24 is a flow diagram of forward call blocking with no handoff.

FIG. 24 represents the logic of step 2008 in FIG. 20. Thus, FIG. 24 represents forward call admissions processing without handoff, and is based on the call-blocking threshold represented by FwdCallBlockTH(k, $f_i$). The processing of FIG. 24 is similar to that of FIG. 20. Here, it is assumed that calls not in handoff are blocked if the non-handoff call blocking threshold is reached. An actual wireless communication system might employ this same threshold blocking. The CDMA planner does not, at least in some embodiments, distinguish between on-going and new calls with regard to blocking calls that are not in handoff. As with the call blocking discussed in conjunction with FIG. 20, here the service level is reduced until the power falls below the blocking threshold. Then, the forward transmit power is calculated based on the reduced service level. If no resources were available for admitting the subscriber, the corresponding link is turned off and the subscriber unit power is set to zero.

Regarding the detailed steps of FIG. 24, Walsh code counts and running power totals are made current for the sector (steps 2300 and 2302). The CDMA planner then determines whether the current subscriber is a voice or data user (step 2304). In either case, if the power required by the subscriber is less than the available remaining power for that type of user in the sector, the subscriber is admitted, and Wash code counts, running powers, and supplemental channel counts are all updated to reflect the admission (see steps 2306–2314 for voice and steps 2308–2320 for data). Call admissions processing then continues for the next subscriber. Note that call admissions may shift back and forth between the logic flow of FIG. 20 and FIG. 24, depending upon whether or not a handoff condition exists.

Figure 25:
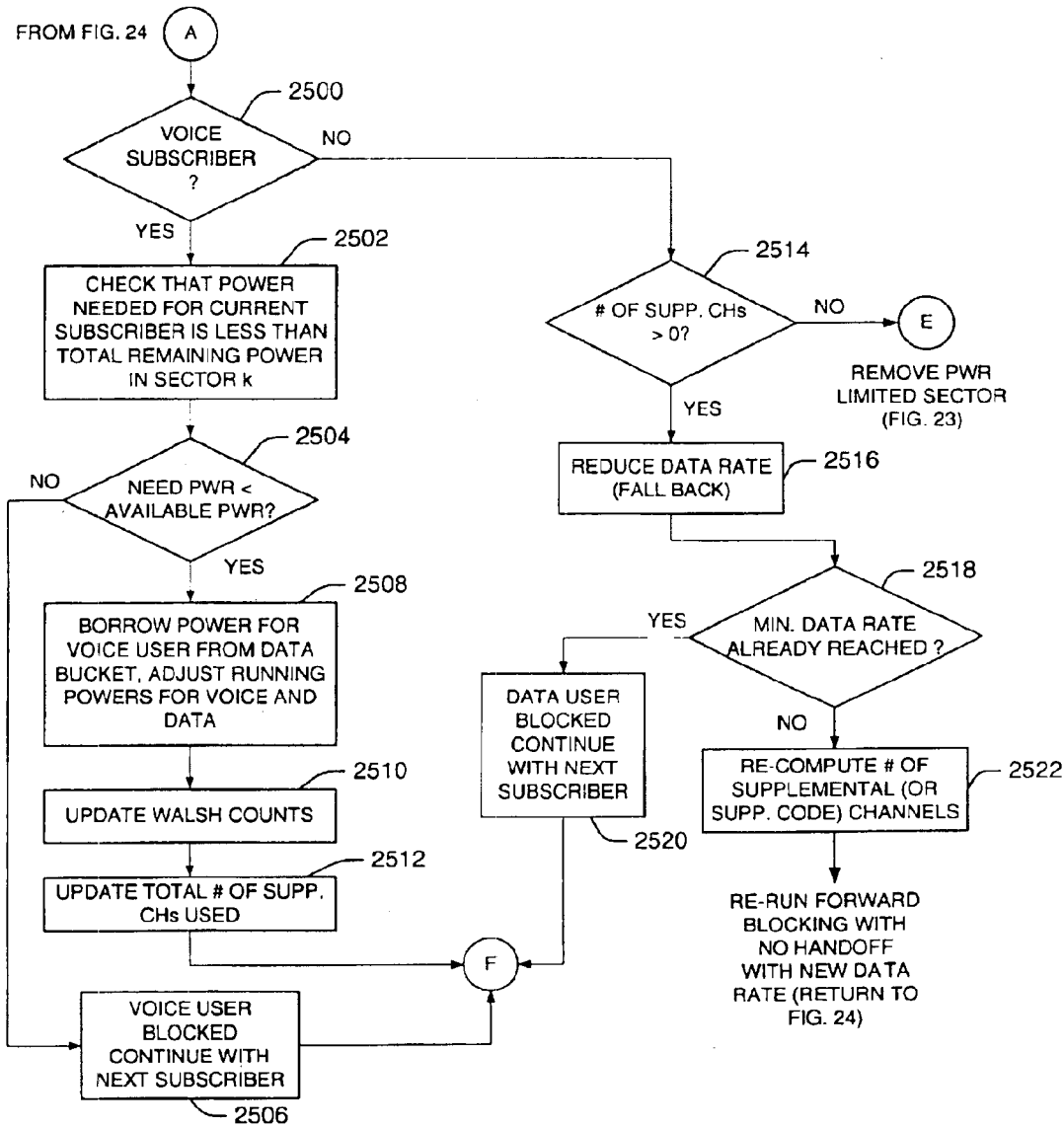
FIG. 25 is a flow diagram of power bucketing procedures for call admission with no handoff.

If for either voice or data users, the available remaining voice or data power at the sector is less than that required for caller admission, processing branches to Point A of FIG. 25. In implementing a power bucketing scheme that prioritizes voice users (step 2500), the CDMA planner checks whether the power needed for the current subscriber is less than the total remaining power in the sector k (step 2502). Total remaining power here refers to unallocated forward link power available at the sector k, which may be represented as the combination of remaining voice power and remaining data power. If the needed power is less than the total remaining power (step 2504), the CDMA planner borrows the power necessary to admit the voice subscriber from the data power bucket (step 2508).

The remaining power is then updated for the sector k (step 2508), Walsh code counts are updated (step 2510), and the total # of supplemental channels used is updated (step 2512). Call admission processing then continues for the next subscriber (refer to entry Point F in FIG. 20).

If the current subscriber is a data subscriber (step 2500), the CDMA planner determines whether the subscriber's supplemental channel count is greater than zero (step 2514). If not, the power limited sector is removed (refer to Point E of FIG. 23). If the subscriber's supplemental channel count is greater than zero, the CDMA planner reduces the subscriber's data rate (implements fall back) (step 2516). Then, the CDMA planner checks whether the minimum allowed data rate for the application associated with the subscriber has already been reached (step 2518). Fall back is not permissible where the next fall back step would reduce the subscriber's data rate below that permitted by the subscriber's associated application. Thus, if the minimum fall back rate was already reached, the data user is blocked (step 2520), and call admission processing continues for the next subscriber (refer to Point F, FIG. 20). If the minimum data rate had not already been reached, the CDMA planner recomputes the # of supplemental channels or supplemental code channels required at the reduced data rate (step 2522), and call admissions with no handoff is re-run for the current subscriber at the reduced data rate (refer to FIG. 24).

Radio configurations were mentioned in the reverse and forward link analysis discussions above. In IS-2000 networks, subscriber units (e.g., mobile or stationary wireless access terminals) may operate with a number of different radio configurations. For example IS-95B compatible subscriber units may operate in radio configurations 1 or 2 (RC1, RC2), which define fundamental and supplemental code channels, as well as corresponding data rates. IS-2000 compatible subscriber units extend the number of configurations. The CMDA planner preferably incorporates the first five radio configurations defined in the TIA/EIA IS-2000A standard for the Forward Link, and these configurations include RC3, RC4, and RC5. As earlier noted, each of these configurations relate to the number of supplemental channels and supplemental code channels assigned and the corresponding data rate of those channels. Additionally, the allowable fall back rates are defined for each application type associated with one or more of the subscriber units within the simulation population. The allowable fall back rates are based on the specifications in the standard. The minimum data rate in the set represents the minimum operational data rate for a corresponding application. These fall back rates are used in the forward and reverse link fall back procedures discussed earlier herein. Note that forward and reverse link fall back rates are independent. The peak data rate required per application, indicated by $\hat{R}b$ is also defined independently for the forward and reverse links. Similarly, the smallest or lowest data rate permissible for a given application type is identified as $\hat{R}b\_min$, and is likewise independently defined for the forward and reverse links.

The CDMA planner reconciles the radio configuration between each subscriber and the sector or sectors supporting that subscriber in any given simulation trial run. Initially, the CDMA planner is configured such that the required or compatible radio configurations are defined for each subscriber based on associated application data rate, and the allowable Frame Error Rate (FER). Allowable or maximum FERs are defined per application on a per channel basis, and likewise for each sector.

Performance data relating the bit energy-to-noise ratio $$\left(\frac{E_b}{N_t}\right)$$

versus FER may be expressed as a set of performance curves. The above parameters (e.g., Radio Configuration, data rate and FER) are used to access these performance curves to determine the $$\left(\frac{E_b}{N_t}\right)$$

value. For a subscriber unit, the CDMA planner selects the Radio Configuration compatible with the defined application type that provides the lowest resource consumption, which correlates to selecting the Radio Configuration having the lowest $$\left(\frac{E_b}{N_t}\right)$$

value.

All the $$\left(\frac{E_b}{N_t}\right)$$

values are generated based on an associated set of independent simulations. Each value generated preferably depends on the following variable set: radio configuration, data rate set, target FER (e.g., 0.5%, 1.0%, 2.0%, 5.0%, 10%), system type (e.g., fixed or mobile), channel code (e.g., convolutional or turbo code), channel type (e.g., pedestrian, vehicle, fixed, etc.). Based on the characteristics associated with the subscriber and the corresponding application, the CDMA planner selects the proper value from the set of energy-to-noise simulation results. The $$\left(\frac{E_b}{N_t}\right)$$

values generated from the simulations are presented to the planner user as default recommended values, but may be overruled or replaced if desired.

Modeling subscribers based on data rate permits users of the planning tool to incorporate mixed or different data rates in the CDMA planner's simulation runs, as well as permitting tool users to define or modify the simulated data rates as newer, higher data rate services evolve. Call models as used by the CDMA planner are also flexible enough to incorporate future changes regarding new applications and configurations.

At a given receiver (subscriber unit), the value of the bit energy-to-interference ratio $$\left(\frac{E_b}{I_o}\right)$$

changes depending upon the location of the subscriber unit. Relative mobility between the subscriber unit and a sector (base station) also affects the $$\left(\frac{E_b}{N_t}\right)$$

measurement at the associated sectors. The CDMA planner may incorporate one or more additional subscriber-specific identifiers to quantify or indicate relative mobility. Different sets of randomly generated static users in each trial based on demand and subscriber distribution specifications provide a technique to simulate time and mobility trends in the system simulation.

$\hat{R}_{b\_Rvs}^{(n)}(\text{im}(\text{ibin},f_i))$ represents the peak data rate for an application associated with a given subscriber unit in the reverse link.

$$[\tilde{R}_{b\_Rvs}^{fall\_back}]_{[p]}(im(ibin, f_i))|_{p=1,\ldots,min} = \quad \text{(Eq. 31)}$$
$$\{[\tilde{R}_{b\_Rvs}^{fall\_back}]_{[1]}(im(ibin, f_i)), \ldots, [\tilde{R}_{b\_Rvs}^{fall\_back}]_{[min]}(im(ibin, f_i))\}$$

identifies the set of all possible data rates available for the application in the reverse link. Note that the last element in the set represents the minimum allowable data rate.

$FER_{req\_R-FCH}^m(im(bin,f_i))$ and $FER_{req\_R-SCH_1,\ldots,N}^m(im(ibin,f_i))$ represent the required or maximum allowable FER for the fundamental and supplemental code channels in the reverse link. The letter N represents the number of SCCHs required for the application for the given FER requirement. The maximum value of N is preferably seven for SCCHs in RC1 and RC2. For RC3, RC4, and RC5, the preferred maximum value for SCHs is two.

$$[RC_{Rvs}]_{[i]}(im(ibin, f_i))|_{i=1,\ldots,4} = \quad \text{(Eq. 32)}$$
$$\{[RC_{Rvs}]_{[1]}(im(ibin, f_i)), \ldots, [RC_{Rvs}]_{[4]}(im(ibin, f_i))\}$$

identifies all the radio configurations compatible with the subscriber unit in the reverse link. In the reverse link, the CDMA planner incorporates radio configurations from RC1 to RC4, from those specified in the TIA/EIA IS-2000A standard. For the forward link, configuration data $\hat{R}_{b\_Fwd}^{(N)}(im(ibin,f_i))$ identifies the peak data rate for the application in the forward link.

$$[\tilde{R}_{b\_Fwd}^{fall\_back}]_{[q]}(im(ibin, f_i))|_{q=1,\ldots,min} = \quad \text{(Eq. 33)}$$
$$\{[\tilde{R}_{b\_Fwd}^{fall\_back}]_{[1]}(im(ibin, f_i)), \ldots, [\tilde{R}_{b\_Fwd}^{fall\_back}]_{[min]}(im(ibin, f_i))\}$$

identifies the set of all possible data rates available for the application on the forward link. This set contains all the possible fall back rates for the application, including the minimum data rate compatible with the application.

$FER_{req\_F-FCH}^c(im(ibin,f_i))$ represents the required FER on the fundamental channel in the forward link, while $FER_{req\_F-SCH_1,\ldots,M}^c(im(ibin,f_i))$ represents the required FER on the supplemental channels (SCH or SCCH) for the application. In these two equations, the letter M represents the maximum number of supplemental channels for the required FER and is preferably a maximum of seven for RC1 and 2, and two for RC3, 4, and 5.

Thus, $[RC_{Fwd}]_{[i]}(im(ibin, f_i))|_{i=1,\ldots,5} =$
$$\{[RC_{Fwd}]_{[1]}(im(ibin, f_i)), \ldots, [RC_{Fwd}]_{[5]}(im(ibin, f_i))\}$$

identifies all the radio configurations compatible with the given subscriber in the forward link. In the forward link, the CDMA planner incorporates radio configurations from RC1 to RC5 from the set of radio configurations specified in the TIA/EIA IS-2000A standard. At this point, we have identified the compatible radio configurations for both reverse and forward links, based on FER, application data rate requirements, and the radio configuration specifications for both subscriber units and sectors in the system.

A first matrix may be used to express all possible radio configurations in the reverse link. Preferably, the matrix has two columns, one per channel type, with the first column used for fundamental channels, and the second for supplemental channels. The elements of the matrix are the $$\left(\frac{E_b}{N_t}\right)$$

values discussed earlier. A "−1" may be placed in any element position where the corresponding radio configuration is not supported by the corresponding subscriber unit. The matrix may thus be expressed as, $$M_{ID\_EbNt}^m(i, j) = \begin{bmatrix} m_{11} & m_{12} & \ldots & m_{1j} & \ldots & m_{1(N+1)} \\ m_{21} & m_{22} & \ldots & m_{2j} & \ldots & m_{2(N+1)} \\ m_{31} & m_{32} & \ldots & m_{3j} & \ldots & m_{3(N+1)} \\ m_{41} & m_{42} & \ldots & m_{4j} & \ldots & m_{4(N+1)} \end{bmatrix}_{4\times(N+1)} \quad \text{(Eq. 34)}$$

Where the expression, $$M_{ID\_E_bN_t}^m(i,j) = \quad \text{(Eq. 35)}$$
$$\underset{\{\forall j \in \{1,\ldots,N\}\}}{Graph} \left( \begin{array}{c} \hat{R}_{b-Rvs}^{(n)}(im(ibin, f_i)), FER_{req\_R-SCH_j}^m \\ (im(ibin, f_i)), [RC_{Rvs}]_{(i)}(im(ibin, f_i)), \\ \left[\left(\frac{E_b}{N_t}\right)_{req\_SCH_{j\_tch}}^m (im(ibin, f_i))\right]^{Convolutional}_{Codes} \end{array} \right)$$

may be used to generate the individual matrix element values based on the FER vs.

$$\left(\frac{E_b}{N_t}\right)$$

performance curves or data described earlier. Note that additional data sets or matrices are generated separately for Turbo Coding as defined by the IS-2000 standard, if the tool user wishes to simulate operation with Turbo Codes in addition to the standard convolutional coding.

For the reverse link, inputs to the equation above may be expressed as $$x_q = \hat{R}_{b\_Rvs}^{(n)}(im(ibin, f_i)) \; \forall \; p, q \in \mathcal{J} \geq 1, \quad \text{(Eq. Set 36)}$$
$$x_2 = \begin{cases} FER_{req\_R-FCH}^m(im(ibin, f_i)) & \text{IF } q=1 \\ FER_{req\_R-SCH_{1,\ldots,N}}^m(im(ibin, f_i)) & \text{IF } q=2 \end{cases}, \text{ and}$$
$$x_3 = [RC_{Rvs}]_{[p]}(im(ibin, f_i)) \text{ with } p = 1, \ldots, 4$$

where the first expression is the peak data rate associated with the corresponding application, and the second expression represents the corresponding FER required per channel type. The third expression represents the set of supported radio configurations.

The corresponding output (i.e., the value extracted from the performance data) $y_1$ is given as, $$y_1 = \quad \text{(Eq. 37)}$$

$$\begin{cases} \left[\left(\frac{E_b}{N_t}\right)^m_{req\_FCH\_tch}(im(ibin, f_i))\right]^{turbo\_code} & \text{IF} \\ \{[App^m(im(ibin, f_i))]^{turbo\_code} \equiv 1\} \text{ and } \{q = 1\} \\ \left[\left(\frac{E_b}{N_t}\right)^m_{req\_SCH_j\_tch}(im(ibin, f_i))\right]^{turbo\_code} & \text{IF} \\ \{[App^m(im(ibin, f_i))]^{turbo\_code} \equiv 1\} \text{ and } \{q = 2\} \forall\, j \in \{1, \ldots, N\} \\ \left[\left(\frac{E_b}{N_t}\right)^m_{req\_FCH\_tch}(im(ibin, f_i))\right]^{convolutional}_{code} & \text{IF} \\ \{[App^m(im(ibin, f_i))]^{turbo\_code} \neq 1\} \text{ and } \{q = 1\} \\ \left[\left(\frac{E_b}{N_t}\right)^m_{req\_SCH_j\_tch}(im(ibin, f_i))\right]^{convolutional}_{code} & \text{IF} \\ \{[App^m(im(ibin, f_i))]^{turbo\_code} \neq 1\} \\ \text{and } \{q = 2\} \forall\, j \in \{1, \ldots, N\} \end{cases}$$

The above output value corresponds to the reverse required traffic bit-energy-to-background-noise-power-spectral-density for each channel associated with a subscriber at the assigned frequency $f_i$. Here, M and N represent maximum supplement channel numbers for the given radio configurations as discussed above. If Turbo Codes are being used, an appropriate flag may be set so as to permit proper selection in the above expression.

The above function generates a matrix element with a value of "−1" for unsupported radio configurations. Further, if N is less than M, the current matrix row will be filled with −1 values until the column number M=1 is reached. Similarly, if M is less than N, the corresponding row will be filled with −1 values until the N+1 column is reached.

With the above information, the radio configuration is selected based on, $$[RC(i)]^{rvs}_{Selected} = \quad \text{(Eq. 38)}$$

$$\left\{ i \in M^m_{ID\_EbNt}(i, j) : \min_{\substack{\forall i=1,\ldots,4 \\ \text{and} \\ \forall M^m_{ID\_EbNt}(i,j) \neq -1}} \left\{ \sum_{j=1}^{N+1} M^m_{ID\_EbNt}(i, j) \right\} \right\}$$

The above matrix generation and radio configuration selection is repeated on the forward link for each subscriber. Possible reverse link and forward link radio configuration are selected based on the specified data rate, target FER, system type, channel code, and channel type. The CDMA planner searches these available sets of simulated values on both the forward and reverse links independently to find the radio configurations having the lowest corresponding bit-energy-to-noise values. The selected radio configurations may differ between the forward and reverse links for a given subscriber. The CDMA planner may allow operation with different forward and reverse link radio configurations, or it may allow the planner user to specify the radio configurations to be used based on the identified sets of allowable radio configurations. Alternatively, the CDMA planner may reconcile the forward and reverse link radio configurations by selecting the best match between the lowest bit-energy-to-noise configurations in the forward and reverse links.

The CDMA planner as described above is subject to much variation, and thus the foregoing descriptions and accompanying drawings should be understood to be exemplary rather than limiting. Indeed, the scope of the present invention is limited only by the attached claims and the reasonable equivalents thereof.

What is claimed is:

1. A method of simulating operation of a wireless communication network, the method comprising:
    defining a radio base station in a simulation environment;
    defining two or more categories of subscribers;
    defining a plurality of candidate subscriber units associated with said radio base station in said simulation environment, each said candidate subscriber unit associated with one of said subscriber categories;
    determining a total forward link power available to said base station for transmitting signals to said candidate subscriber units;
    performing a call admission procedure to randomly admit candidate subscriber units for service from said base station, said call admission procedure comprising, for each candidate subscriber unit;
        determining the unallocated total forward link power;
        determining the additional power requested by the candidate subscriber unit;
        determining the available power for a corresponding subscriber category; and
        admitting said candidate subscriber unit if the additional power requested by the candidate subscriber unit is within the limits of the unallocated total forward link power and the available power for the corresponding subscriber category.

2. The method of claim 1 further comprising recomputing the available power for the corresponding subscriber category and the unallocated total forward link power when a subscriber unit is admitted.

3. The method of claim 1 wherein determining the available power for a corresponding subscriber category comprises:
    determining a power threshold for the subscriber category;
    determining the total power previously allocated to other subscriber units in the corresponding category;
    determining the available power by subtracting the previously allocated power to all subscribers in the corresponding category from the power threshold.

4. The method of claim 3 wherein determining a power threshold for the subscriber category comprises:
    determining a power reserve for each subscriber category;
    determining the power threshold for a given subscriber category by subtracting the power reserve for the remaining subscribe categories form the total forward link power.

5. The method of claim 3 wherein determining the unallocated total forward link power comprises;
    determining the total power previously allocated to all subscriber units; and
    determining the unallocated total forward link power by subtracting the power previously allocated to all subscriber units from the total forward link power.

6. The method of claim 1 wherein said subscriber categories include voice users and data users.

7. The method of claim 1 wherein the power threshold for said voice users prior to beginning said call admissions procedure is equal to the total forward link power.

8. The method of claim 7 wherein the power threshold for said voice users prior to beginning said call admissions procedure less than the total forward link power.

9. The method of claim 7 wherein the power threshold for said data users prior to beginning said call admissions procedure is equal to the total forward link power.

10. The method of claim 7 wherein the power threshold for said data users prior to beginning said call admissions procedure less than the total forward link power.

11. The method of claim 1 wherein determining the additional power requested by the candidate subscriber unit comprises determining the additional power required by the subscriber unit at a desired data rate.

12. The method of claim 11 wherein determining the additional power requested by the candidate subscriber unit further comprises recomputing the requested power at a fallback data rate if the additional power required at the desired data rate exceeds the available power for the corresponding subscriber category.

13. A method of simulating call admission in a wireless communications network, said method comprising:
   defining a plurality of candidate subscriber units, each said candidate subscriber unit associated with on e of a plurality of subscriber categories;
   determining a total forward link power available for transmitting signals to said candidate subscriber units;
   determining the additional power requested by the candidate subscriber unit;
   admitting successive ones of said candidate subscriber units in a determined order if, for each candidate subscriber unit, the additional power requested by the candidate subscriber unit is within the limits of an unallocated total forward link power and an available power for a corresponding subscriber category; and
   recomputing the available power for the corresponding subscriber category and the unallocated total forward link power when a subscriber unit is admitted.

14. The method of claim 13 wherein determining the available power for a corresponding subscriber category comprises:
   determining a power threshold for the subscriber category;
   determining the total power previously allocated to other subscriber units in the corresponding category; and
   determining the available power by subtracting the previously allocated power to all subscribers in the corresponding category from the power threshold.

15. The method of claim 14 wherein determining the unallocated total forward link power comprises;
   determining the total power previously allocated to all subscriber units; and
   determining the unallocated total forward link power by subtracting the power previously allocated to all subscriber units from the total forward link power.

16. The method of claim 13 wherein determining a power threshold for the subscriber category comprises:
   determining a power reserve for each subscriber category; and
   determining the power threshold for a given subscriber category by subtracting the power reserve for the remaining subscribe categories form the total forward link power.

17. The method of claim 13 wherein said subscriber categories include voice users and data users.

18. The method of claim 17 wherein the power threshold for said voice users prior to beginning said call admissions procedure is equal to the total forward link power.

19. The method of claim 17 wherein the power threshold for said voice users prior to beginning said call admissions procedure less than the total forward link power.

20. The method of claim 17 wherein the power threshold for said data users prior to beginning said call admissions procedure is equal to the total forward link power.

21. The method of claim 17 wherein the power threshold for said data users prior to beginning said call admissions procedure less than the total forward link power.

22. The method of claim 13 wherein determining the additional power requested by the candidate subscriber unit comprises determining the additional power required by the subscriber unit at a desired data rate.

23. The method of claim 22 wherein determining the additional power requested by the candidate subscriber unit comprises recomputing the additional power at a fallback data rate if the additional power required at the desired data rate exceeds the available power for the corresponding subscriber category.

24. A method of simulating call admission in a wireless communications network having a mix of subscriber units including both voice users and data users, said method comprising:
   determining a total forward link power available for serving said candidate subscriber units;
   defining an power reserve for serving voice users;
   defining an available power for serving data users based on said power reserve for voice users;
   admitting successive ones of said candidate subscriber units in a determined order if, for each candidate subscriber unit, the additional power required by said subscriber unit is within the limits of an unallocated total forward link power;
   excluding a data user when the additional power required by said data user exceeds the available power for data users; and
   recomputing the unallocated total forward link power when a subscriber unit is admitted.

25. The method of claim 24 further comprising recomputing the available power for data users when a data user is admitted.

26. The method of claim 24 further comprising:
   defining an power reserve for serving data users;
   defining an available power for serving voice users based on said power reserve for data users; and
   excluding a voice user when the additional power required by said voice user exceeds the available power for voice users.

27. The method of claim 26 further comprising recomputing the available power for voice users when a voice user is admitted.

28. A method of simulating call admission in a wireless communications network having a mix of subscriber units including both voice users and data users, said method comprising:
   determining a total forward link power available for serving said candidate subscriber units;
   defining an power reserve for serving data users;
   computing an available for voice users based on said power reserve for data users;
   admitting successive ones of said candidate subscriber units in a determined order if, for each candidate subscriber unit, the additional power required by said subscriber unit is within the limits of an unallocated total forward link power;

excluding a voice user when the additional power required by said voice user exceeds the available power for voice users; and recomputing the unallocated total forward link power when a subscriber units is admitted.

29. The method of claim 28 further comprising recomputing the available power for voice users when a voice user is admitted.

30. A computer readable media storing a program for simulating call admission in a wireless communications network, said program comprising:

program code for defining a plurality of candidate subscriber units, each said candidate subscriber unit associated with one of a plurality of subscriber categories;

program code for determining a total forward link power available for transmitting signals to said candidate subscriber units;

program code for determining the additional power requested by the candidate subscriber unit;

program code for admitting successive ones of said candidate subscriber units in a determined order if, for each candidate subscriber unit, the additional power requested by the candidate subscriber unit is within the limits of an unallocated total forward link power and an available power for a corresponding subscriber category; and program code for recomputing the available power for the corresponding subscriber category and the unallocated total forward link power when a subscriber unit is admitted.

31. The computer readable media of claim 30 wherein the program code for determining the available power for a corresponding subscriber category comprises:

program code for determining a power threshold for the subscriber category;

program code for determining the total power previously allocated to other subscriber units in the corresponding category; and program code for determining the available power by subtracting the previously allocated power to all subscribers in the corresponding category from the power threshold.

32. The computer readable media of claim 31 wherein the program code for determining the unallocated total forward link power comprises;

program code for determining the total power previously allocated to all subscriber units; and program code for determining the unallocated total forward link power by subtracting the power previously allocated to all subscriber units from the total forward link power.

33. The computer readable media of claim 30 wherein the program code for determining a power threshold for the subscriber category comprises:

program code for determining a power reserve for each subscriber category; and program code for determining the power threshold for a given subscriber category by subtracting the power reserve for the remaining subscribe categories form the total forward link power.

34. The computer readable media of claim 30 wherein the program code for determining the additional power requested by the candidate subscriber unit comprises determining the additional power required by the subscriber unit at a desired data rate.

35. The computer readable media of claim 34 wherein the program code for determining the additional power requested by the candidate subscriber unit comprises recomputing the additional power at a fallback data rate if the additional power required at the desired data rate exceeds the available power for the corresponding subscriber category.

* * * * *

UNITED STATES PATENT AND TRADEMARK OFFICE
CERTIFICATE OF CORRECTION

PATENT NO. : 6,934,555 B2
APPLICATION NO. : 09/896369
DATED : August 23, 2005
INVENTOR(S) : Silva et al.

It is certified that error appears in the above-identified patent and that said Letters Patent is hereby corrected as shown below:

In Fig. 18B, Sheet 18 of 25, for Tag "1816", Line 1, delete "REACH" and insert -- REACHED --, therefor.

In Fig. 18B, Sheet 18 of 25, for Tag "1816", Line 3, after "WHETHER THE" delete "THE".

In Fig. 23, Sheet 23 of 25, above "FIG.23", Line 2, delete "POWR" and insert -- POWER --, therefor.

In Column 19, Lines 34-35, delete " $\hat{R}_{b\_Fwd}(im(ibin,fi))$ " and insert -- $\hat{R}_{b\_fwd}(im(ibin,f_i))$ --, therefor.

In Column 19, Line 57, delete "$[App^m(im(ibin.fi))_{data}^{voice}]$" and insert -- $[App^m(im(ibin.f_i))_{data}^{voice}]$ --, therefor.

In Column 20, Line 1, delete "$[App^m(im(ibin.fi))_{data}^{voice}]$" and insert -- $[App^m(im(ibin.f_i))_{data}^{voice}]$ --, therefor.

In Column 24, Line 30, delete "$[App^m(im(ibin.fi))]_{data}^{voice}$" and insert -- $[App^m(im(ibin,f_i))_{data}^{voice}]$ --, therefor.

In Column 26, Line 52, after "minimum" delete "in".

In Column 28, Line 36, delete "(k, $f_{i)}$" and insert -- (k, $f_i$) --, therefor.

In Column 38, Line 23, in Claim 1, delete "unit;" and insert -- unit: --, therefor.

In Column 38, Line 54, in Claim 4, delete "subscribe categories form" and insert -- subscriber categories from --, therefor.

In Column 38, Line 57, in Claim 5, delete "comprises;" and insert -- comprises: --, therefor.

In Column 39, Line 22, in Claim 13, delete "on e" and insert -- one --, therefor.

In Column 39, Line 49, in Claim 15, delete "comprises;" and insert -- comprises: --, therefor.

UNITED STATES PATENT AND TRADEMARK OFFICE
CERTIFICATE OF CORRECTION

PATENT NO. : 6,934,555 B2
APPLICATION NO. : 09/896369
DATED : August 23, 2005
INVENTOR(S) : Silva et al.

It is certified that error appears in the above-identified patent and that said Letters Patent is hereby corrected as shown below:

In Column 39, Line 61, in Claim 16, delete "subscribe categories form" and insert -- subscriber categories from --, therefor.

In Column 41, Line 5, in Claim 28, delete "units" and insert -- unit --, therefor.

In Column 42, Line 24, in Claim 33, delete "subscribe categories form" and insert -- subscriber categories from --, therefor.

Signed and Sealed this

Eighth Day of April, 2008

JON W. DUDAS
*Director of the United States Patent and Trademark Office*